United States Patent
Sugimura

[11] Patent Number: 5,926,627
[45] Date of Patent: Jul. 20, 1999

[54] ELECTRONIC APPARATUS FOR ENGAGING A PORTABLE COMPUTER WITH AN EXPANSION UNIT

[75] Inventor: Hideo Sugimura, Kawasaki, Japan

[73] Assignee: Canon Kabushiki Kaisha, Tokyo, Japan

[21] Appl. No.: 08/847,742

[22] Filed: Apr. 22, 1997

[30] Foreign Application Priority Data

| Apr. 26, 1996 | [JP] | Japan | 8-131010 |
| Sep. 10, 1996 | [JP] | Japan | 8-261248 |
| Sep. 10, 1996 | [JP] | Japan | 8-261249 |
| Sep. 10, 1996 | [JP] | Japan | 8-261252 |

[51] Int. Cl.$^6$ ........................................... G06F 1/16
[52] U.S. Cl. ................................. 395/281; 361/683
[58] Field of Search ........................... 395/281, 282; 361/683, 686; 364/708.1

[56] References Cited

U.S. PATENT DOCUMENTS

| 5,313,596 | 5/1994 | Swindler et al. | 395/281 |
| 5,323,291 | 6/1994 | Boyle et al. | 361/683 |
| 5,347,425 | 9/1994 | Herron et al. | 361/683 |
| 5,477,415 | 12/1995 | Mitcham et al. | 361/686 |
| 5,535,093 | 7/1996 | Noguchi et al. | 361/686 |
| 5,552,959 | 9/1996 | Penniman et al. | 361/686 |
| 5,737,541 | 4/1998 | Shimizu et al. | 395/281 |

*Primary Examiner*—Glenn A. Auve
*Attorney, Agent, or Firm*—Fitzpatrick, Cella, Harper & Scinto

[57] ABSTRACT

In an electronic apparatus with a separably combining main body and expander, a pair of movable claws which are interlocked with an opening/closing lever are provided on an upper surface of the expander and a pair of fixed claws are provided on the opposite side of the opening/closing lever. A connecting connector is arranged at an intermediate position of the pair of movable claws. A retaining lever for blocking an opening of the opening/closing lever in a closed state of the opening/closing lever is provided. A first detector detects an opening/closing state of the opening/closing lever and a second detector detects the position of the retaining lever. A connecting state of the main body and the expander is synthetically discriminated on the basis of signals from the two detectors and a connection signal of the connector for connecting the main body and the expander.

23 Claims, 33 Drawing Sheets

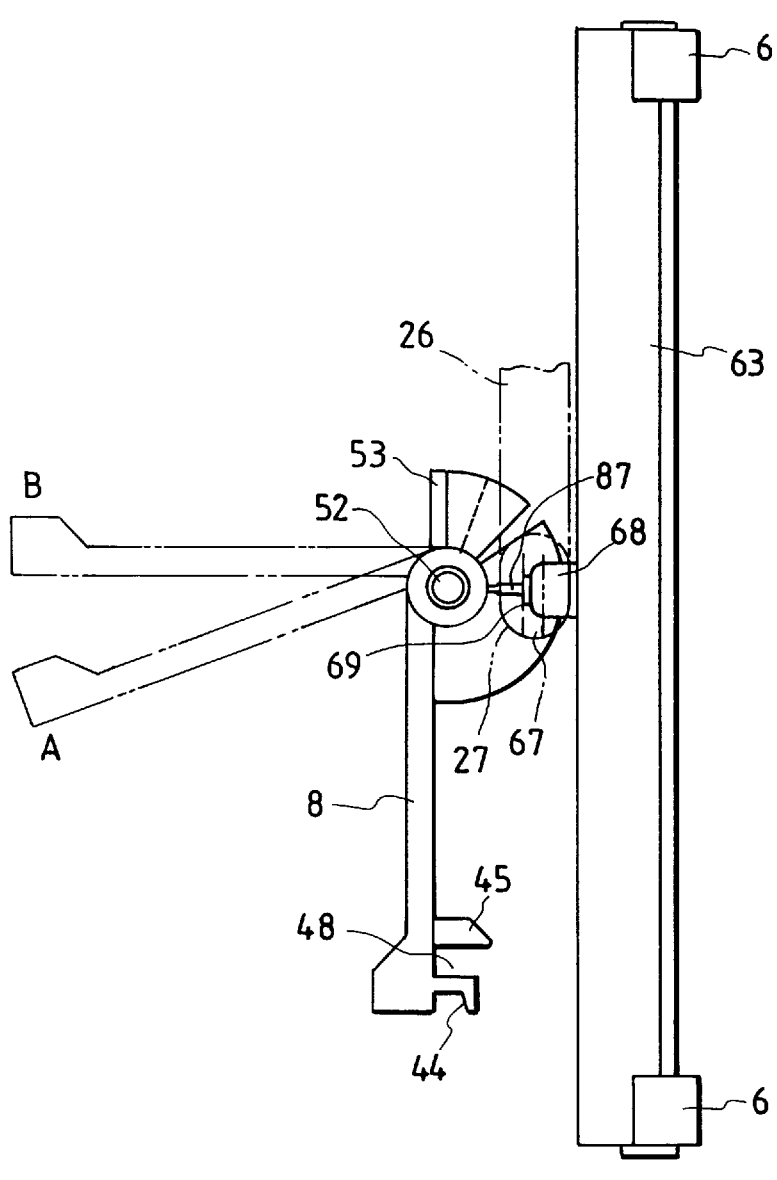
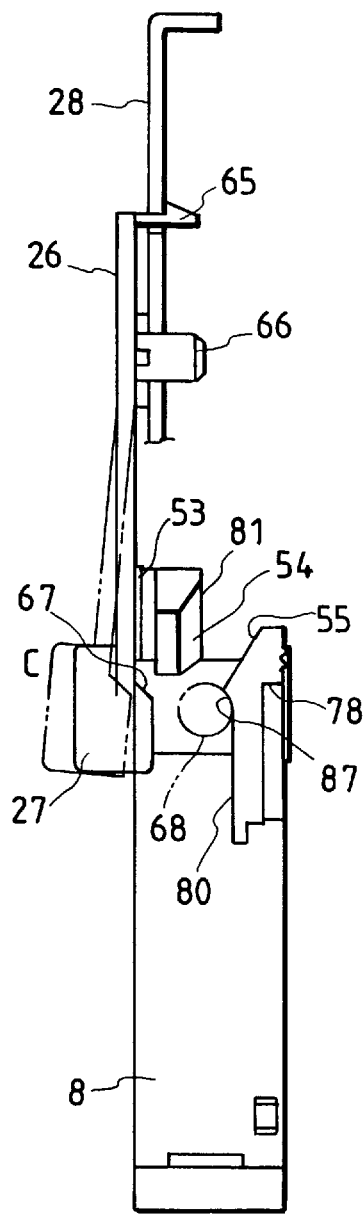
FIG. 13
FIG. 14

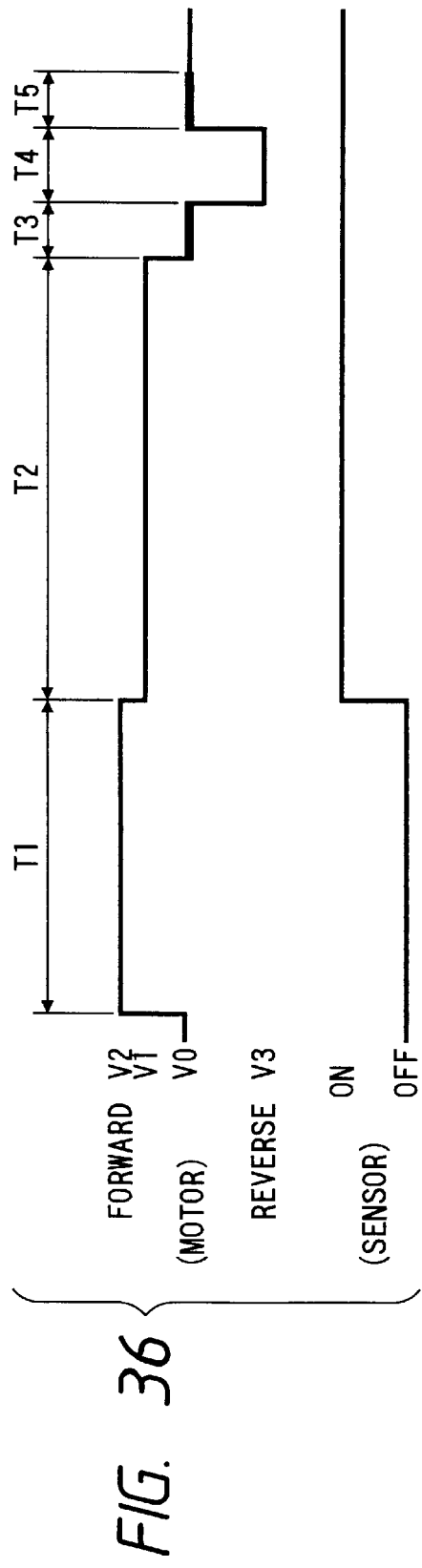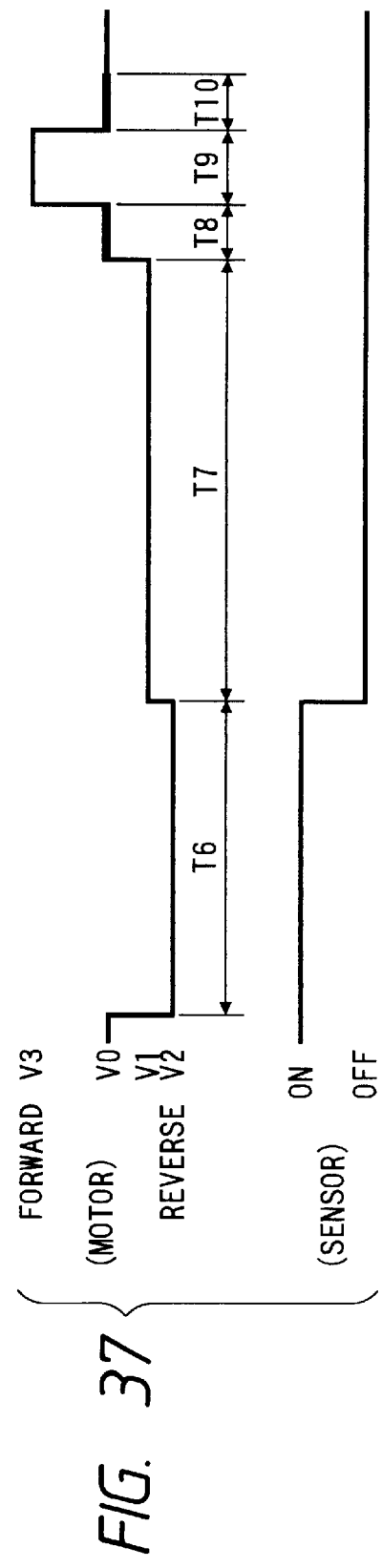

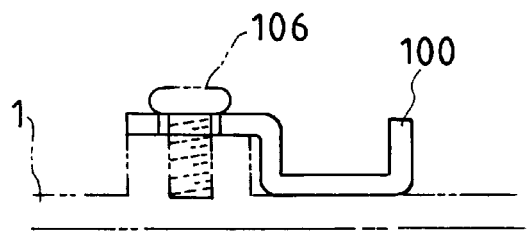
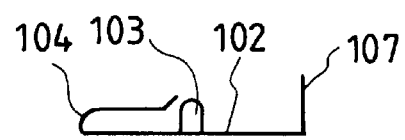
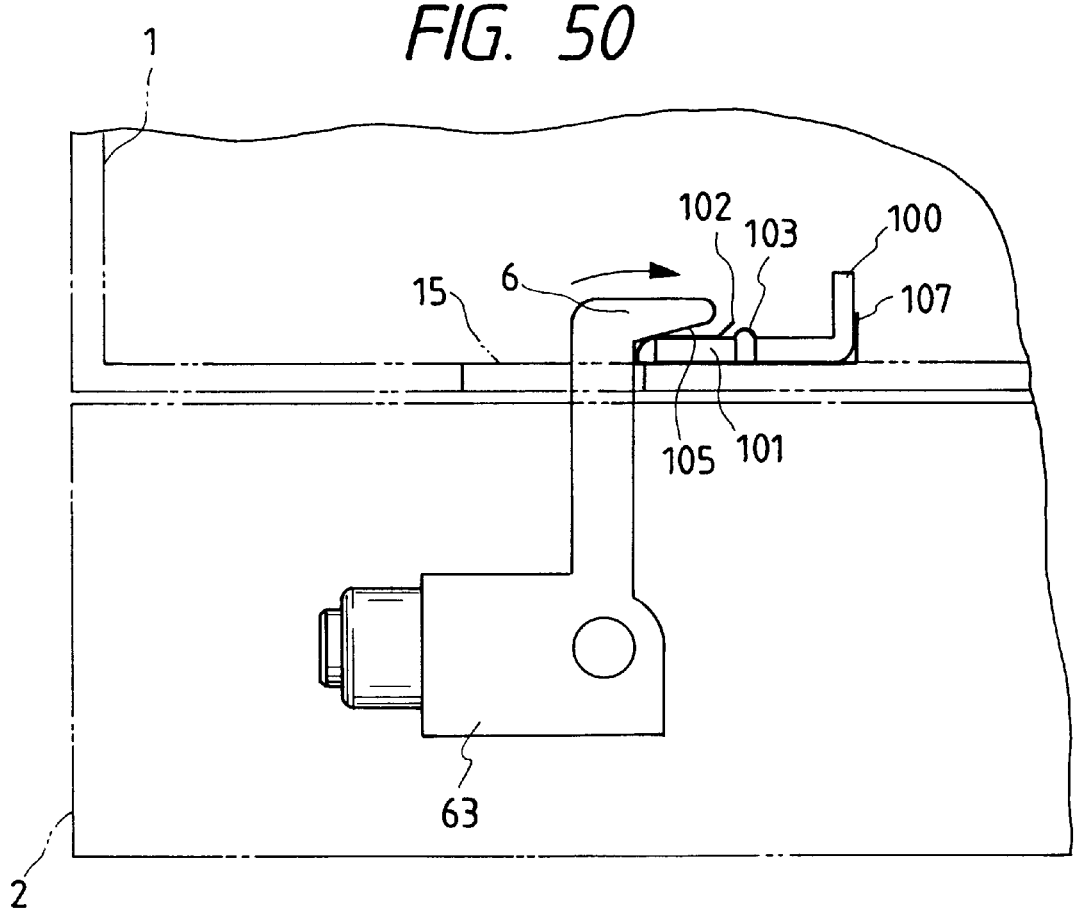

5,926,627

ELECTRONIC APPARATUS FOR ENGAGING A PORTABLE COMPUTER WITH AN EXPANSION UNIT

BACKGROUND OF THE INVENTION

1. Field of the Invention

The invention relates to an electronic apparatus and, more particularly, to an electronic apparatus constructed in a manner such that an electronic apparatus main body (hereinafter, simply referred to as a main body) and an expander can be freely separated (detachable).

2. Related Background Art

Hitherto, in order to expand a function of a notebook-sized personal computer or the like, there has been proposed a system constructed in a manner such that a main body 1 is combined to an expander 2 having therein an FDD, an HDD, an expansion board, or the like by a connection of a connector (main body side connector) 3 and a connector (expander side connector) 4 as shown in FIG. 2.

The conventional system is constructed as if a desktop personal computer is separated to a notebook-sized personal computer and an expander. The expander is used in a desktop state as a prerequisite and is large in size. According to such a construction, it is sufficient to have a structure such that the connector 3 of the main body 1 is connected to the connector 4 of the expander 2 as shown in FIG. 2. They can be sufficiently combined by merely adding a retaining member or the like such that the main body is not pulled out.

In the notebook-sized personal computer or the like, however, in addition to a realization of a compact size by providing the main body with a portability function, importance is also made to portability even when the notebook-sized personal computer is combined to the expander nowadays. A coupling mechanism of the main body and expander which can be constructed in a compact size and a good operability is obtained and a high reliability is derived so as not to disconnect the combination when carrying is necessary.

SUMMARY OF THE INVENTION

It is an object of the invention to solve the above drawbacks and to provide an electronic apparatus having portability even when an expander and an electronic apparatus main body are combined.

Another object of the invention is to enable an expander and an electronic apparatus main body to be certainly combined at high operability.

Still another object of the invention is to provide a compact coupling structure with a high reliability for coupling an expander and an electronic apparatus main body.

The above and other objects and features of the present invention will become apparent from the following detailed description and the appended claims with reference to the accompanying drawings.

BRIEF DESCRIPTION OF THE DRAWINGS

FIG. 13 is a diagram for explaining that a movable claw and a separation cap are driven by a cam shape portion of a separation lever shown in FIG. 8;

FIG. 14 is a diagram for explaining that the movable claw and the separation cap are driven by the cam shape portion of the separation lever shown in FIG. 8;

FIG. 36 is a diagram showing a motor driving sequence at the time of locking in another example of FIG. 52;

FIG. 37 is a diagram showing a motor driving sequence at the time of a locking release in the above other example;

FIG. 48 is a cross sectional view showing that a retaining plate shown in FIG. 8 is fixed to the main body;

FIG. 49 is a side elevational view of the retaining member shown in FIG. 8;

FIG. 50 is a diagram showing an engagement of the movable claw and retaining member shown in FIG. 8;

DETAILED DESCRIPTION OF THE PREFERRED EMBODIMENTS

An embodiment of the invention will now be described.

Figure 1:
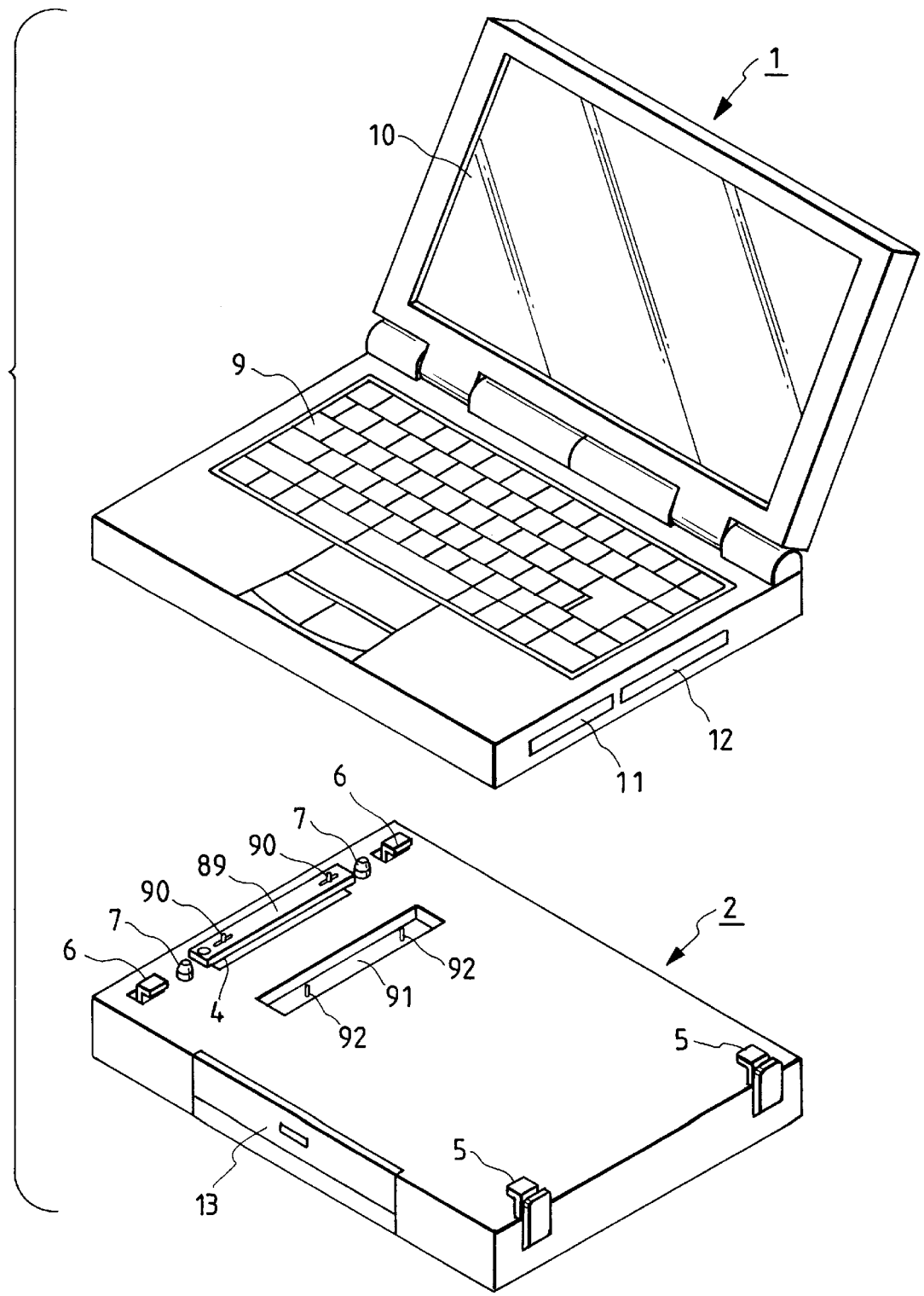
FIG. 1 is a diagram showing construction of a main body and an expander according to an embodiment of the invention.
Figure 2:
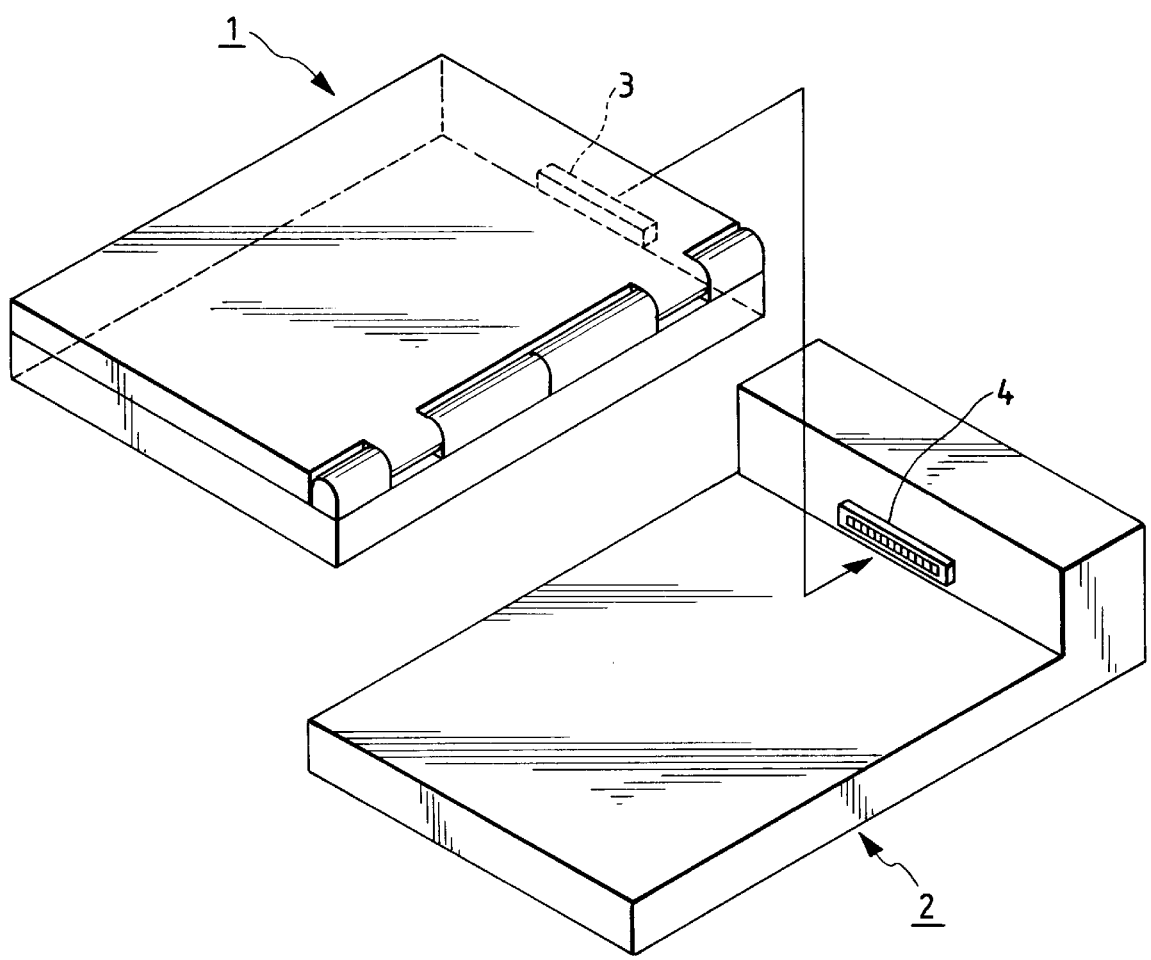
FIG. 2 is a perspective view of an electronic apparatus of a prior art.
Figure 3:
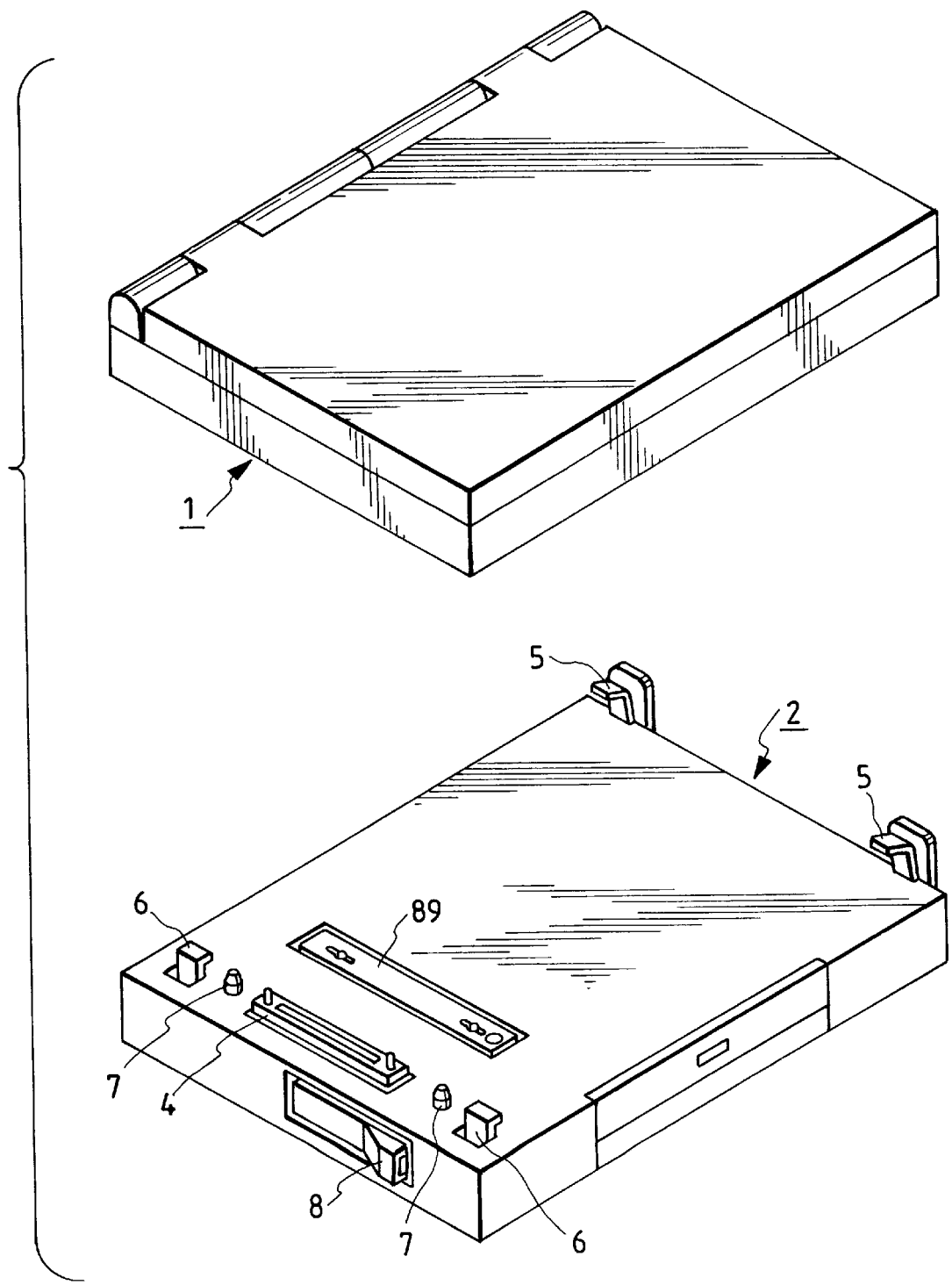
FIG. 3 is a perspective view showing an attaching surface of the expander shown in FIG. 1.
Figure 4:
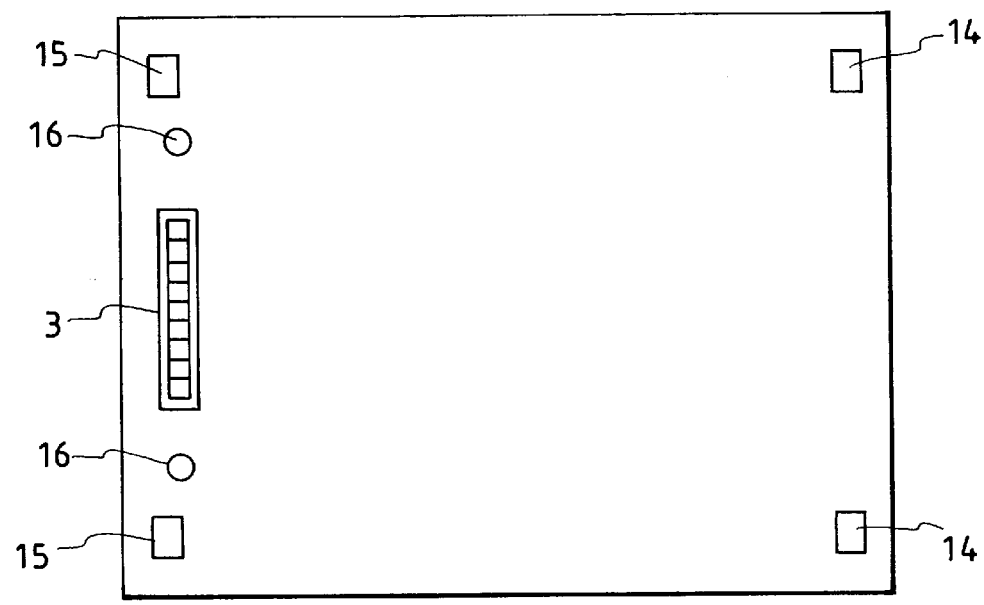
FIG. 4 is a bottom view showing a back side of the main body shown in FIG. 1.

FIGS. 1, 3, and 4 show a construction of an embodiment in a notebook-sized personal computer. The personal computer main body 1 has a display device 10, a keyboard input device 9, a hard disk drive 11, a floppy disk drive 12, and the like. The expander 2 has therein a CD-ROM drive 13 and expansion boards for a communication, a sound source, and the like (not shown). The expander has fixed claws 5 on the right side on the upper surface and movable claws 6 which are interlocked with a separation lever (opening/closing lever) 8 on the left side. The connector 4 is arranged at the intermediate position of the two movable claws 6 so as to be movable by a micro distance. Reference numeral 7 denotes projection pins arranged on both sides of the connector 4. Retaining holes 14 which are retained to the fixed claws 5, retaining holes 15 which are retained to the movable claws 6, and engaging holes 16 which come into engagement with the projection pins 7 are formed on the back surface of the main body shown in FIG. 4. Reference numeral 3 denotes the connector of the main body which is connected to the connector 4 of the expander.

Reference numeral 89 denotes a connector cover. When the expander 2 and main body 1 are separated, the connector cover 89 is covered onto the connector 4 of the expander 2, thereby protecting the connector 4. When the expander and the main body are combined, the connector cover 89 is enclosed into an enclosing portion 91 of the expander.

Figure 26:
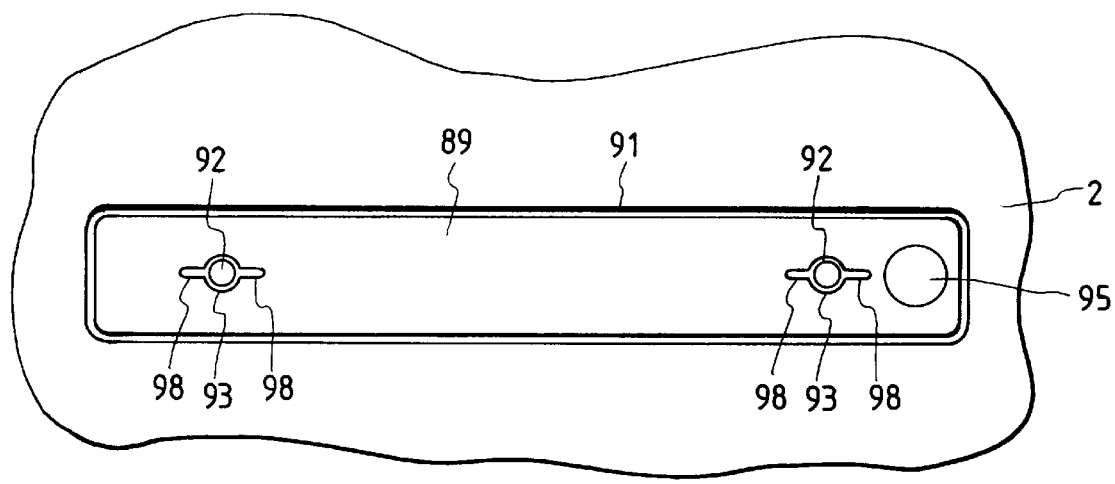
FIG. 26 is a diagram showing a state in which a connector cover shown in FIGS. 1 and 3 is enclosed in the expander.
Figure 27:
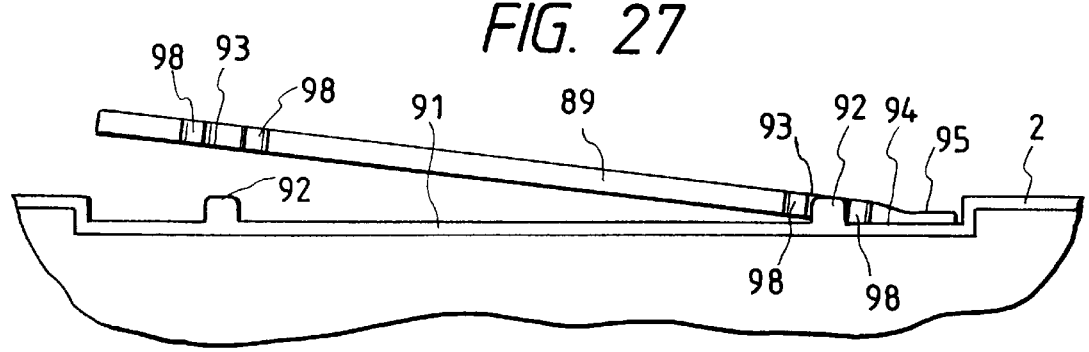
FIG. 27 is a diagram showing a state when the connector cover shown in FIGS. 1 and 3 is taken out from an enclosing portion.
Figure 28:
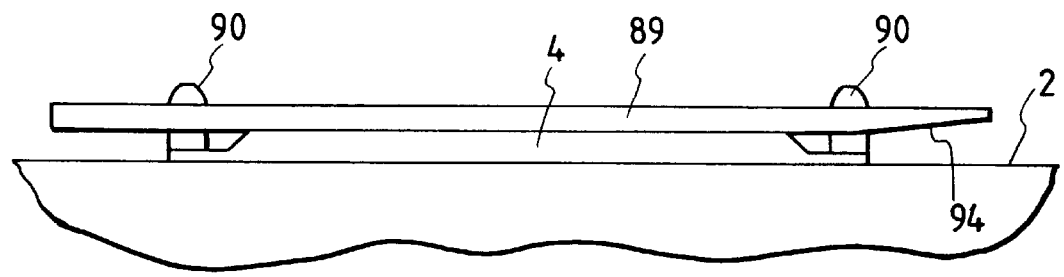
FIG. 28 is a diagram showing a state in which the connector cover shown in FIGS. 1 and 3 is attached to a connector of the expander.

FIGS. 26 to 29 are enlarged diagrams showing attaching and detaching states of the connector cover 89. FIG. 28 shows a state in which the connector cover 89 is attached to the connector 4 by using guide pins 90 of the connector 4. Attaching holes 93 (refer to FIG. 27) of the connector cover 89 are lightly inserted into the guide pins 90 with a pressure.

FIG. 26 shows a state in which the connector cover 89 is enclosed in the enclosing portion 91. The attaching hole 93 is lightly inserted into an attaching boss 92 with a pressure. In the embodiment, a height of boss 92 is equal to or less than the level of the upper surface of the expander. A depth of enclosing portion 91 is equal to or larger than a thickness of connector cover 89. Reference numeral 98 denotes slits extending outwardly in the longitudinal direction of the connector cover 89 from the attaching holes 93. The slits 98 give a resilient elasticity to the attaching hole 93, thereby enabling the boss to be lightly inserted into the hole with a pressure.

FIG. 27 is a cross sectional view showing a state in which the connector cover 89 is taken out from the enclosing portion 91. An inclined portion 94 is formed on the back surface of a concave portion 95 for pressing. When depressing the pressing concave portion 95 from the upper direction, the connector 89 is inclined to a position where the inclined portion 94 collides with the bottom surface of the enclosing portion 91 and the other end is floated up, thereby providing a state in which the cover can be taken out.

Figure 29:
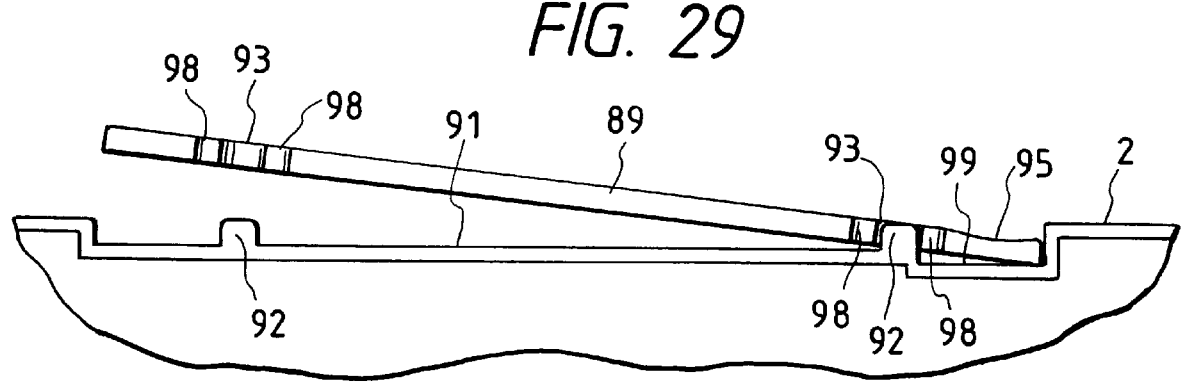
FIG. 29 is a diagram showing a state in which the connector cover shown in FIGS. 1 and 3 is taken out from the enclosing portion.

FIG. 29 shows a state in which the connector cover is taken out in the case where a dent 99 is formed in the enclosing portion 91 in place of providing the inclined portion. By setting a depth of dent 99 to be deeper than a depth of enclosing portion 91, when the pressing concave portion 95 is depressed, the other end is floated up, thereby providing a state in which the cover can be taken out.

As an attaching form of the connector cover to the connector, it is not limited to a method whereby the cover is inserted to the guide pins with a pressure but the cover can be also covered on an outer shape of the connector or can be also fixed to the expander. The same shall also similarly apply to an attaching form to the enclosing portion. The pressing concave portion of the connector cover, the inclined portion, or the dent of the enclosing portion is not limited to only one edge side but they can also be provided on both sides.

Figure 5:
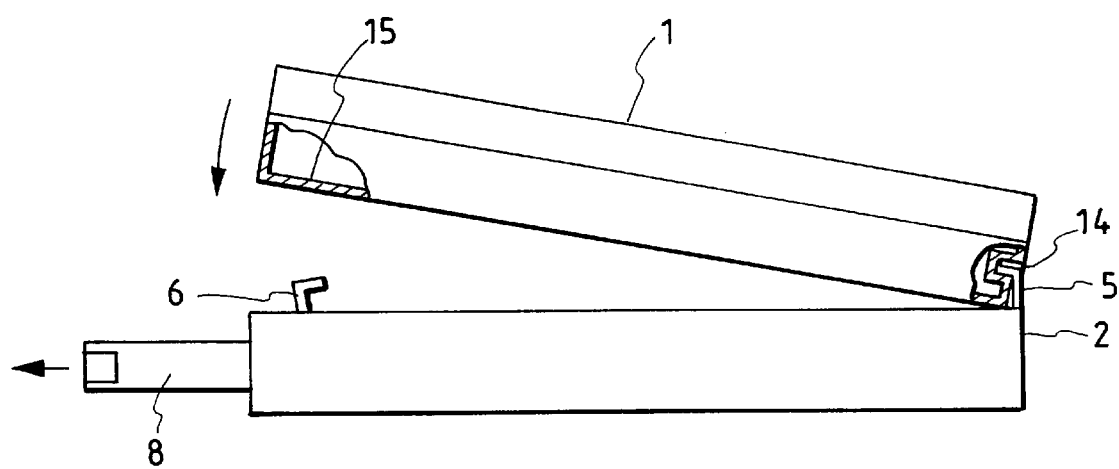
FIG. 5 is a side elevational view for explaining a state just before the main body and expander shown in FIG. 1 are combined.
Figure 6:
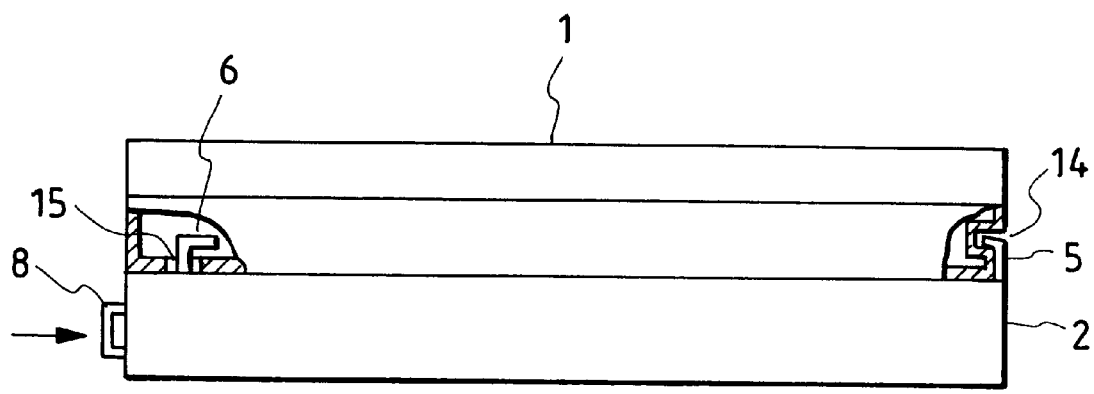
FIG. 6 is a side elevational view for explaining a state just after the main body and expander shown in FIG. 1 were combined.
Figure 7:
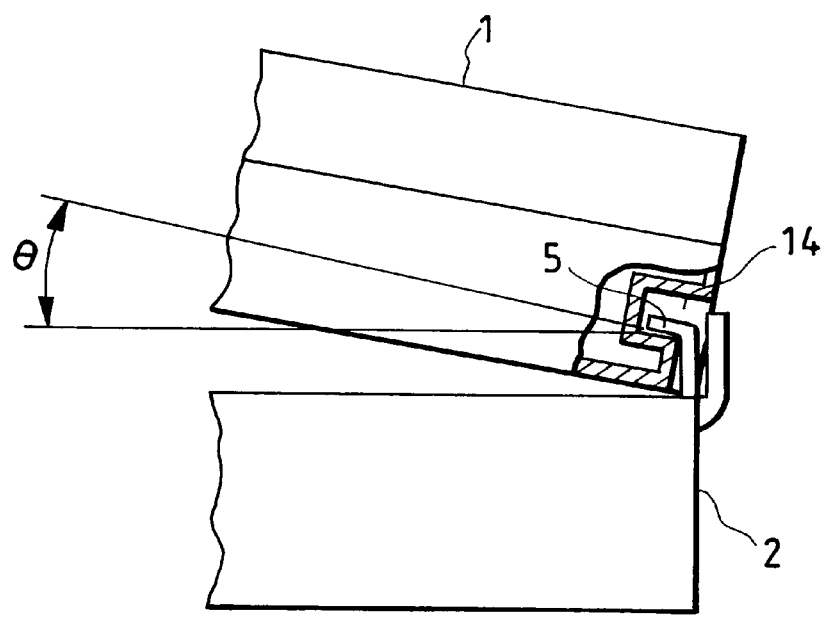
FIG. 7 is an enlarged diagram for explaining a shape of a fixed retaining claw shown in FIG. 5.

FIGS. 5, 6, and 7 show a method of combining the main body and the expander. The separation lever 8 is opened to the outside and in a state in which the movable claws 6 are inclined outwardly, the retaining holes 14 on the right side of the main body are hooked to the fixed claws 5 of the expander. After that, the left side of the main body is fell down, thereby connecting the connectors. After that, when the separation lever 8 is closed, the movable claws 6 are retained into the retaining holes 15, thereby completing the combination. If the shape of the retaining portion of the fixed claw 5 has an inclination θ as shown in FIG. 7, an attaching efficiency is improved. It is preferable to set θ into a value within a range from about 5° to 30°. With such a construction, after the positioning was schematically performed on the fixed claw side, the main body can be smoothly combined to the expander by a slight rotation. Since dimensions in the right/left direction of a product are large and, accordingly, a large rotational radius can be set, the connector portions are actually connected so as to face almost vertically, so that reliability is raised. The fixed claws can also be arranged near the front side surface or rear side surface and the connector separation lever system can be also arranged near the other side surface. With such a structure, an effect similar to that of the above construction can be derived. Since the movable claws 6 are retained to the main body by the closable separation lever 8, the combining state can be certainly recognized by a bodily sensation.

Figure 55:
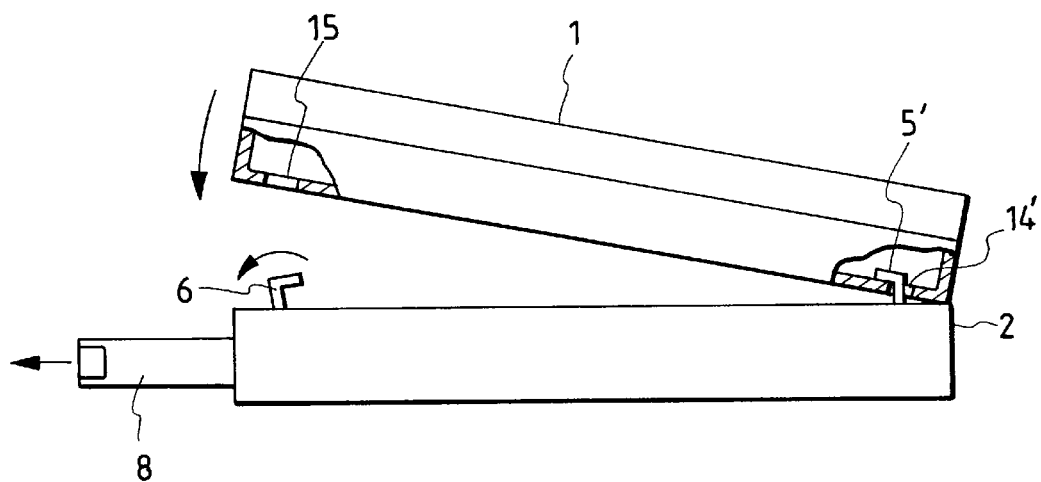
FIG. 55 shows another example of FIG. 5 and is a side elevational view for explaining a combining method of the main body and the expander.
Figure 56:
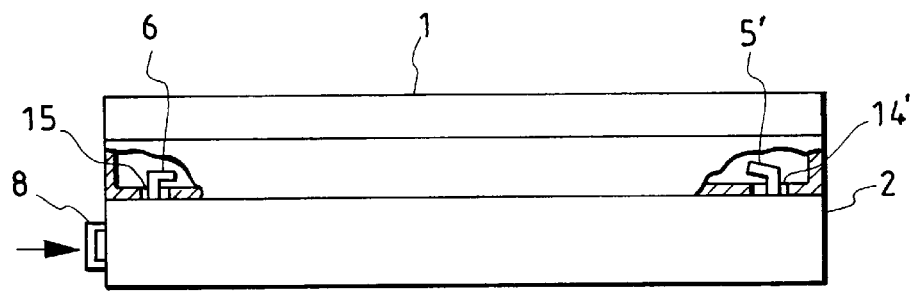
FIG. 56 shows another example of FIG. 6 and is a side elevational view for explaining a combining method of the main body and the expander.

In place of the fixed claws 5 and retaining holes 14 shown in FIGS. 5 to 7, fixed claws 5' and retaining holes 14' of an arrangement as shown in FIGS. 55 and 56 can be also used.

Figure 8:
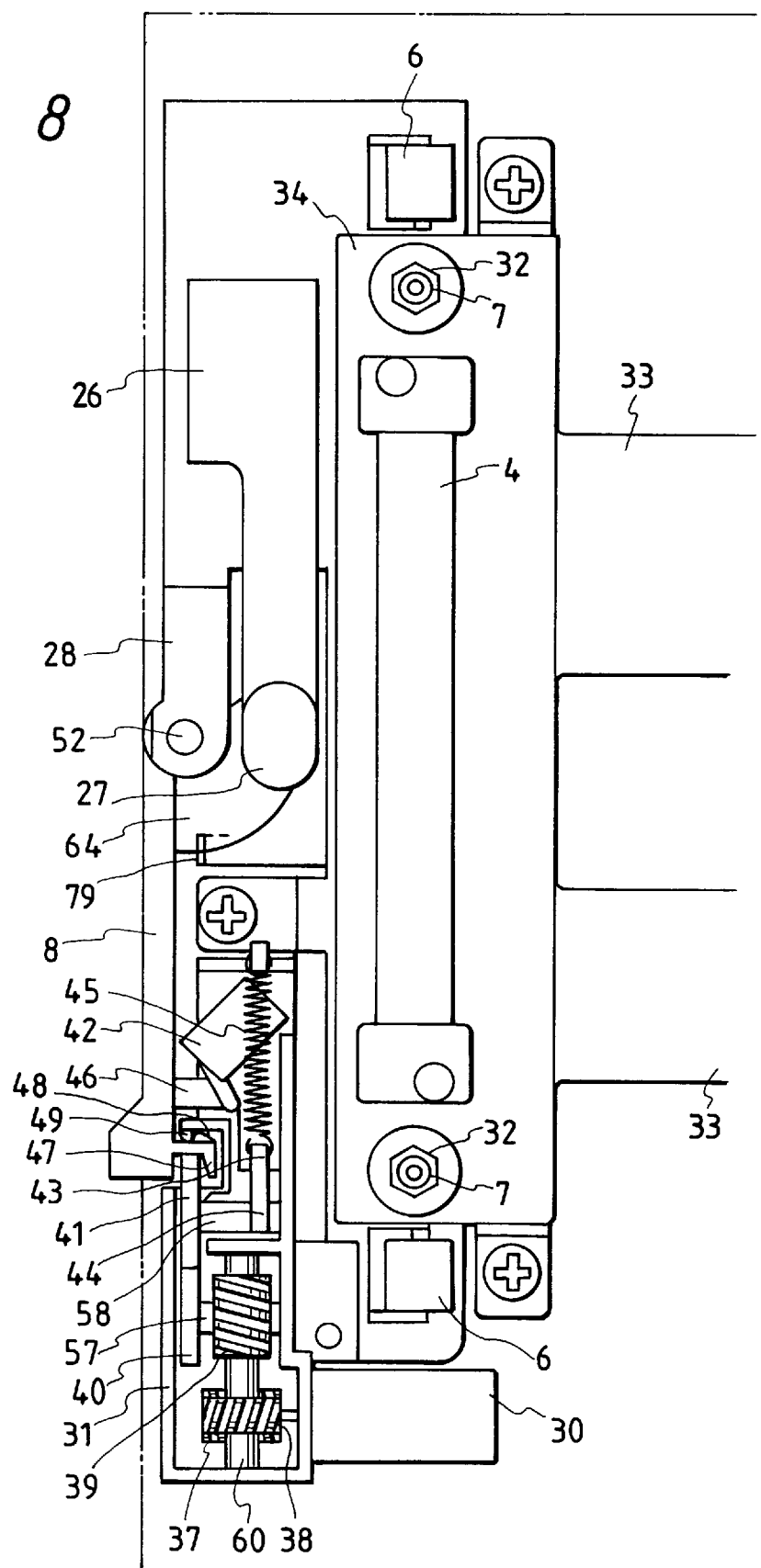
FIG. 8 is a plan view showing a combining mechanism in the expander shown in FIG. 1.
Figure 9:
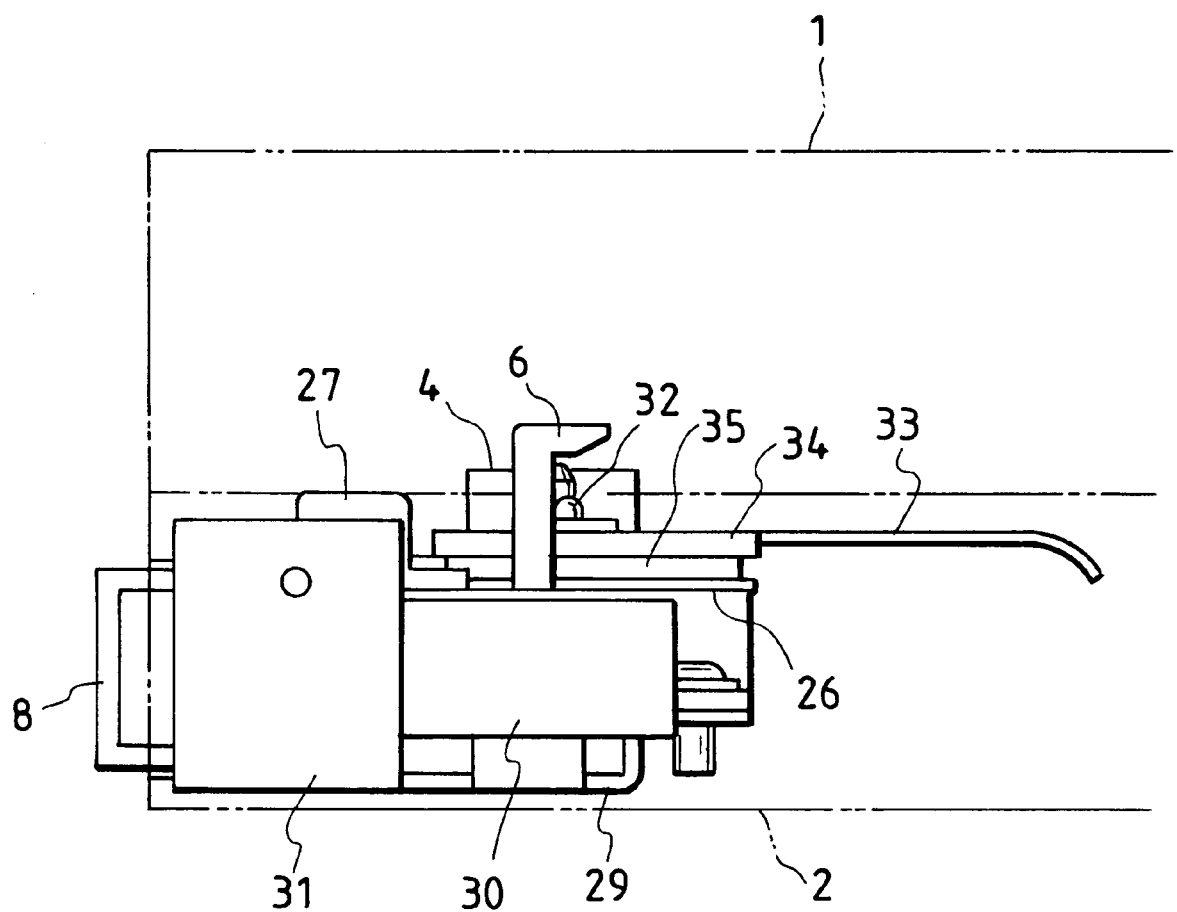
FIG. 9 is a side elevational view showing the combining mechanism in the expander shown in FIG. 1.
Figure 10:
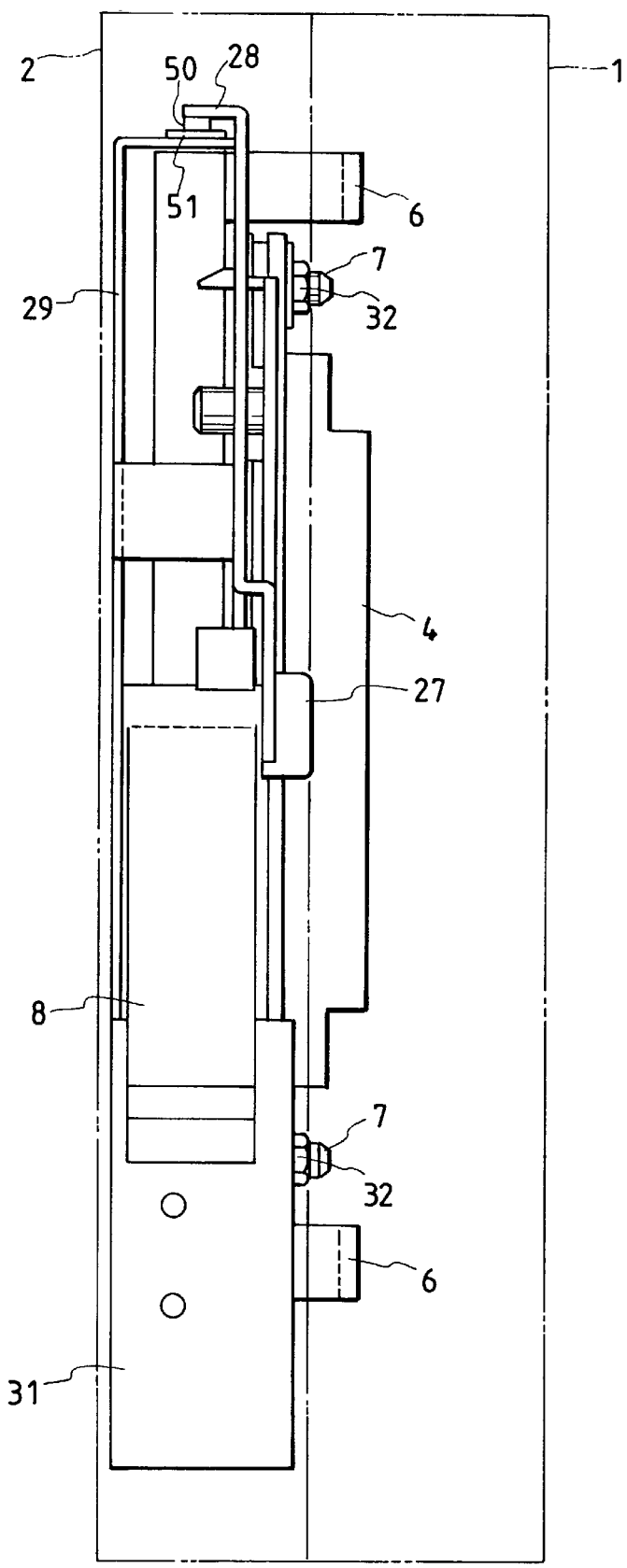
FIG. 10 is a side elevational view showing the combining mechanism in the expander shown in FIG. 1 when it is seen from the direction different from that in FIG. 9.
Figure 11:
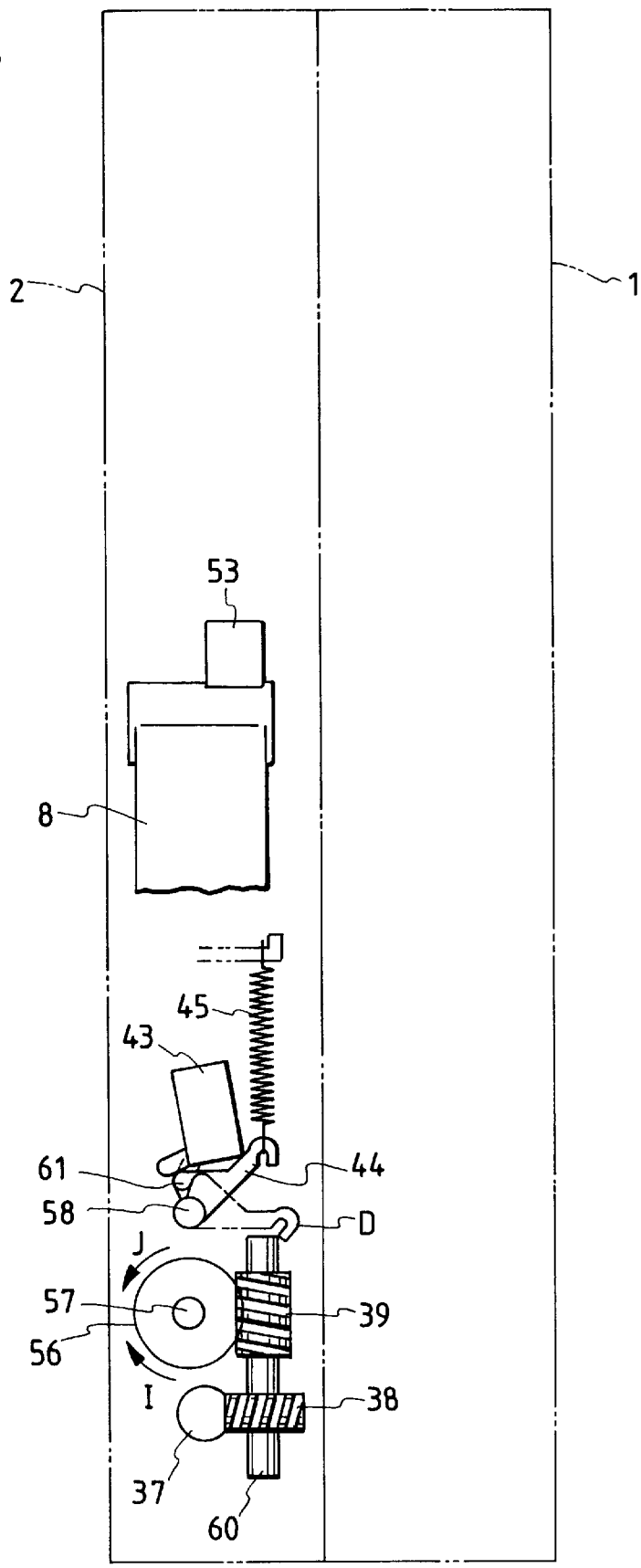
FIG. 11 is an explanatory diagram of a retaining lever mechanism shown in FIG. 8.
Figure 12:
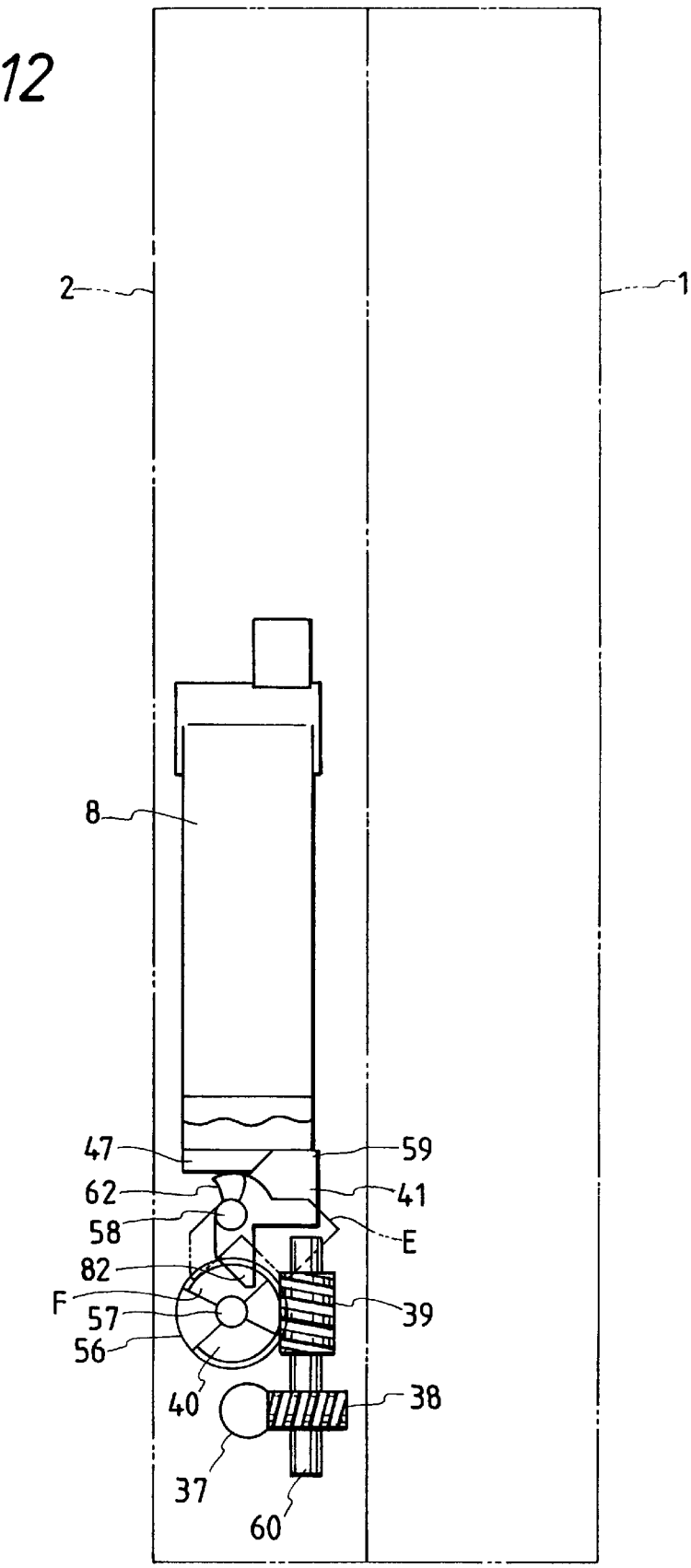
FIG. 12 is an explanatory diagram of the retaining lever mechanism shown in FIG. 8.
Figure 15:
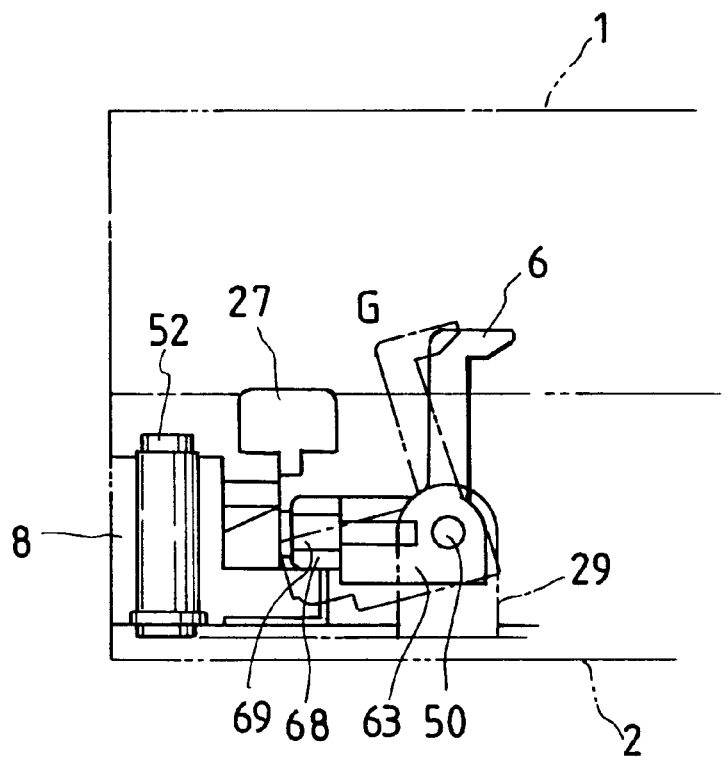
FIG. 15 is a diagram for explaining that the movable claw and the separation cap are driven by the cam shape portion of the separation lever shown in FIG. 8.

FIGS. 8 to 16 show a construction of a separation mechanism unit of a main body and an expander including movable claws, connectors, separation levers, and the like. FIGS. 8 to 10 are whole diagrams of the unit. FIGS. 11 and 12 are diagrams showing a retaining lever driving mechanism. FIGS. 13 to 15 are diagrams showing an interlocking mechanism of the separation lever, movable claws, and a separation cap.

First, an interlocking operation of the separation lever 8, movable claws 6, and a separation cap 26 will now be described. In FIGS. 8 to 10, the separation lever 8 is axially supported to an upper chassis 28 and a lower chassis 29 so as to be rotatable in the horizontal direction by a separation lever axis 52. When the separation lever 8 is opened to a B position in FIG. 13, a stopper portion 78 in FIG. 14 provided in a back portion of a fan portion 64 (FIG. 8) comes into contact with a stopper 79 (FIG. 8) of the lower chassis and is not opened any more. On the contrary, in a closed state of the separation lever, a separation lever retaining convex portion 48 comes into engagement with a bracket retaining convex portion 49. The movable claws 6 are formed integratedly with a claw main body 63 (FIGS. 13 and 15) and are rotatably attached to the lower chassis 29 by a movable claw axis 50. The separation cap 26 is positioned and fixed to the upper chassis 28 by a positioning boss 66 (FIG. 14) and a retaining claw 65 (FIG. 14). The separation lever 8 has a fan-like cam shape around a rotational center. Each of a release cam 54 (FIG. 14) and a locking cam 55 (FIG. 14) is a cam profile whose height changes in proportion to the rotational angle. A cam 53 is a cam to lift up the separation cap 26.

The cam operation will now be described with reference to FIGS. 13 to 15. In the closed state of the separation lever 8, after a movable claw roller 68 was pushed up by the locking cam 55, it is in contact with a straight portion 80 of the locking cam 55 and the movable claws 6 exist at positions where they are retained to the main body (in a vertically standing state as shown by solid lines in FIG. 15). Therefore, the roller 68 is rotatably attached to the main body 63 of the movable claw by a roller axis 69. Further in detail, the roller 68 is provided so as to project to the side in the center portion of the claw main body 63 and is rotatably attached to the roller axis 69 and comes into engagement with the locking cam 55 or release cam 54. When the separation lever 8 is opened, the release cam 54 pushes up the roller 68 (namely, the claw main body 63 is rotated around the movable axis 50 as a center). At an A position, the roller 68 comes into contact with a straight portion 81 of the release cam 54. In this instance, the movable claw 6 is set to a G position in FIG. 15 (inclined state shown by a broken line), thereby releasing the retaining state to the main body. When the separation lever 8 is further opened to a B position, the cam 53 pushes up a lift oblique surface 67 of the separation cap. The separation cap 26 is made of an elastic plastics material. A head of the cap elevates by an elastic deformation in this instance, pushes the main body, and separates the main body from the connector of the expander. When the separation lever 8 is closed, the locking cam 55 pushes up the roller 68 and the movable claw 6 is retained to the main body by a process opposite to the above process.

An inverse tapered portion 87 will now be described. When the separation lever 8 is closed, the roller 68 is pushed up by the locking cam 55 and is pushed up mostly just before the separation lever 8 is completely closed. After that, at the position where the separation lever 8 is fully closed, the roller 68 comes into contact with the straight portion 80. In this state, the inverse tapered portion 87 functions as a resistance and the separation lever 8 is urged to the closed position. The roller 68 comes stably into contact with the straight portion 80 (isolated from the locking cam 55) by the urging cam (inverse tapered portion) 87.

Figure 47:
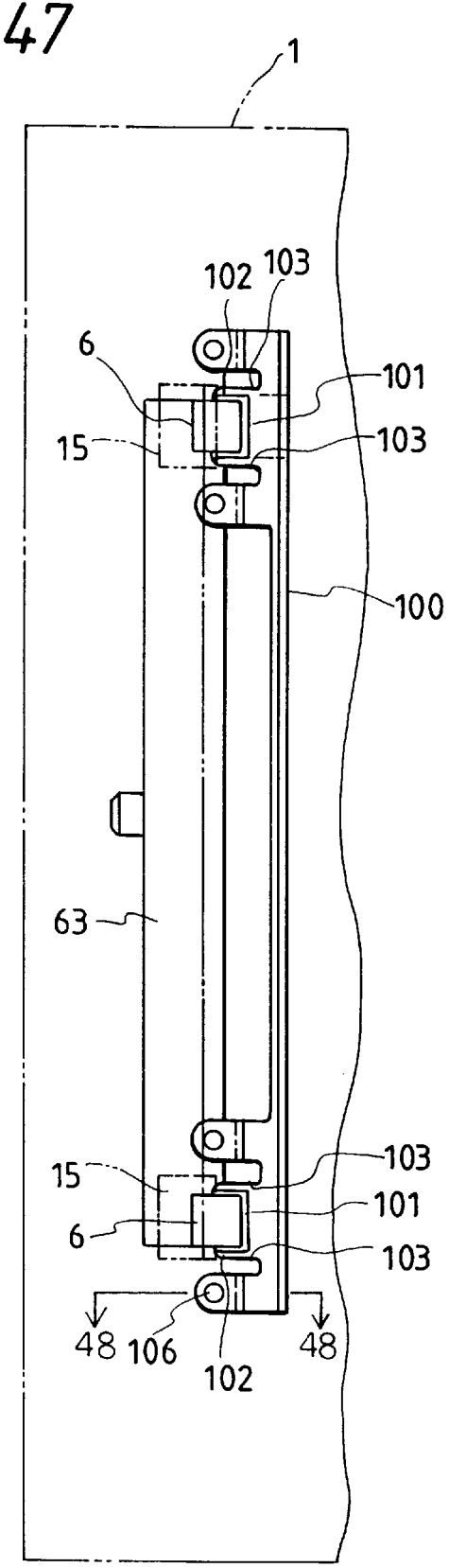
FIG. 47 is a diagram showing a combination of a movable claw and a retaining member shown in FIG. 8.

A retaining portion on the main body side to which the movable claws 6 are retained will now be described with reference to FIGS. 47 to 50. FIGS. 47 and 50 are a plan view and a side elevational view showing a state in which the movable claws are retained to the main body. FIG. 48 is a cross sectional view taken along the line 48—48 in FIG. 47 showing that a retaining plate 100 is fixed to the main body 1 at four positions by screws. FIG. 49 is a side elevational view showing a retaining member 102 attached to a retaining portion 101 of the retaining plate 100.

The structure shown in the foregoing drawings is provided for pulling the main body 1 onto the expander side by an introducing taper 105 of the movable claw 6 and, at the same time, sufficiently fitting the connector.

The retaining plate 100 is a member for providing a rigidity to the main body side when the main body 1 is pulled in. In this embodiment, the retaining plate 100 is made of a steel with a pressure and is tightly fixed to the main body by a screw 106. In the embodiment, the retaining member 102 is made of a stainless thin plate for a spring which is excellent in strength, abrasion resistance, shock resistance, and surface smoothness. Reference numeral 104 denotes an R shape provided so that the introducing taper 105 of the movable claw 6 smoothly slides. Reference numerals 103 and 107 denote positioning portions to the retaining plate 100. By making the retaining member 102 as another part different from the retaining plate 100, an R shape of the edge can be arbitrarily formed and a material which is congenial to the movable claw 6 can be arbitrarily selected. A pulling efficiency of the main body 1 by the movable claw 6 can be improved.

FIGS. 11 and 12 show a construction regarding a retaining lever to prevent that the separation lever is opened when the separation lever is closed. In the closed state of the separation lever 8, a retaining lever 41 is retained to a receiving portion 47 of the separation lever 8 (also refer to FIG. 8), thereby blocking the opening of the separation lever 8. The retaining lever 41 and a retaining sensor lever 44 are integratedly formed through an axis 58 in the horizontal direction and are rotatably attached to a bracket 31 (FIGS. 8 and 9) by the axis 58. Reference numeral 40 denotes a retaining lever driving cam which is formed integratedly with a helical gear 56 through an axis 57 in the horizontal direction. The cam 40 is rotatably attached to the bracket 31 by the axis 57. A reduction worm 39 and a reduction helical gear 38 are formed integratedly with an axis 60 and are rotatably attached to the bracket 31. Reference numeral 37 denotes a worm of a motor 30. The motor 30 is attached to the bracket 31.

The worm 37 of the motor 30 is in engagement with the reduction helical gear 38. The reduction worm 39 which is formed integratedly with the reduction helical gear 38 through the axis 60 is in engagement with the helical gear 56. The rotation of the motor 30, therefore, is transferred to the helical gear 56 through the reduction helical gear 38 and reduction worm 39 and is further transferred from the helical gear 56 to the retaining lever driving cam 40.

When the motor 30 is forwardly rotated, the retaining lever driving cam 40 rotates in the I direction in FIG. 11. When the motor 30 is reversely rotated, the retaining lever driving cam 40 is rotated in the J direction in FIG. 11.

Reference numeral 82 (FIG. 12) denotes an arm portion which is formed integratedly with the retaining lever 41 and is driven by the cam 40. Reference numeral 61 denotes a sensor cam which is formed integratedly with the retaining sensor lever 44 and functions so as to turn on or off a retaining sensor 43.

When the separation lever 8 is locked, the motor is forwardly rotated and the cam 40 is rotated in the I direction. In this instance, the arm portion 82 of the retaining lever is released from the contact state of the cam 40. The retaining lever 41 is retained to the receiving portion 47 by an urging force of an extension coil spring 45. The sensor cam 61 depresses a switch of the sensor 43 and turns on the sensor 43. The driving of the motor is stopped by an ON signal detection.

When unlocking, the motor is reversely rotated and the cam 40 is rotated in the J direction. The cam 40 pushes up the retaining lever arm portion 82. The retaining lever 41 is moved to an E position (shown by a broken line in FIG. 12), thereby releasing the retaining of the separation lever 8. The OFF state of the sensor 43 is detected and the driving of the motor is stopped.

Figure 24:
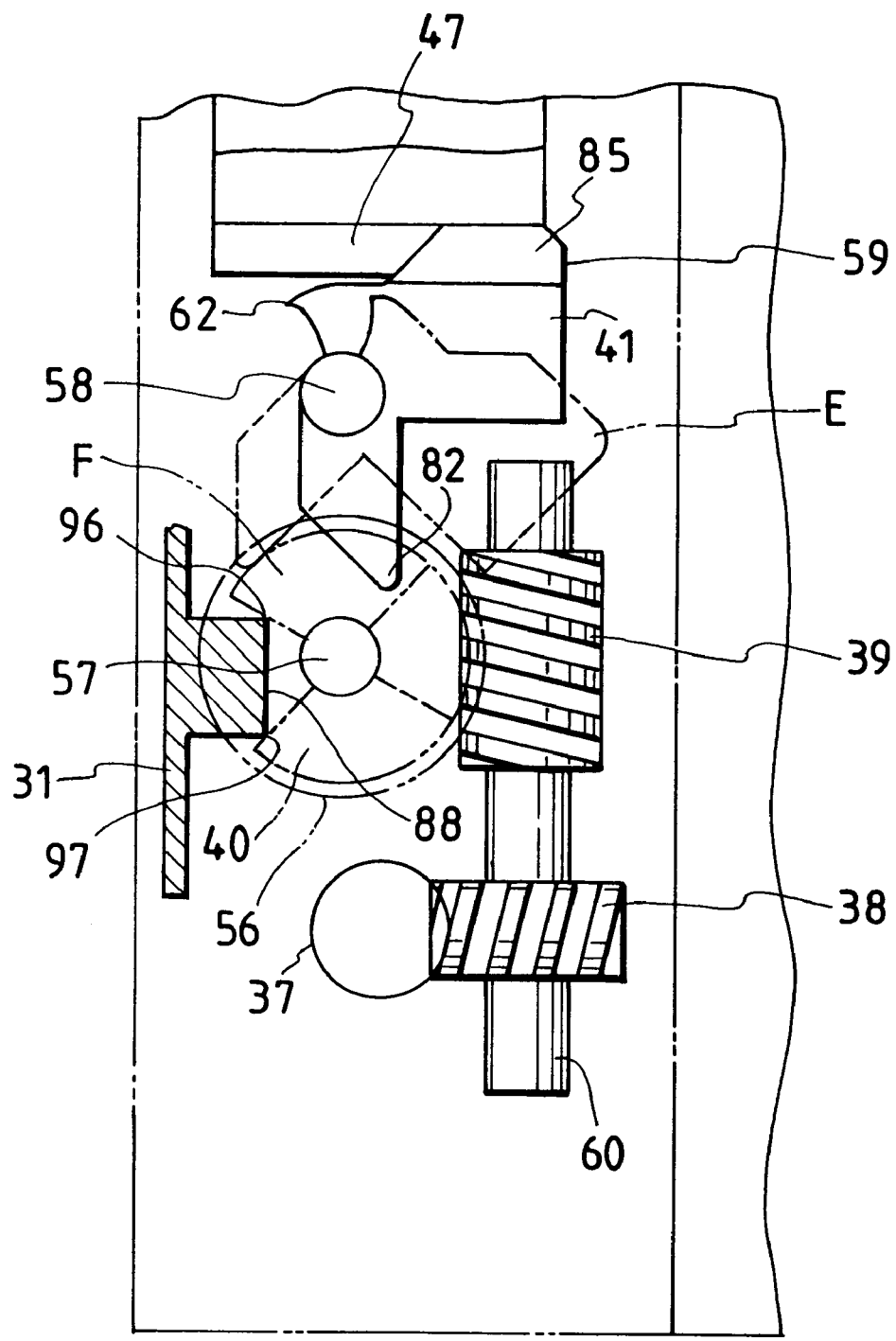
FIG. 24 is a diagram for explaining that a cam that is driven by a motor collides with a stopper and is stopped in FIGS. 11 and 12.

A method of stopping the motor will now be schematically explained. FIG. 24 is an enlarged diagram showing a driving system of the motor. In FIG. 24, reference numeral 88 denotes a stopper portion formed integratedly with the bracket 31; 96 a lock stopper; and 97 a release stopper. Upon locking, as shown in FIG. 11, after the sensor cam 61 turned on the sensor 43, an energization is continued to further rotate the motor for a little while. This current supply gives a margin to certainly drive the retaining lever to the locking position.

In a manner similar to the above, at the time of the release, the current supply to the motor is also continued for a little while after the OFF state was detected by the sensor 43. The lock stopper 96 and release stopper 97 are an abutting portion of the cam 40 for preventing a situation such that when a surplus current is supplied to the motor, the cam 40 excessively rotates. Reference numeral 62 denotes a retaining lever releasing portion in case of emergency. A hole of about $\phi 1$ to $\phi 3$ is formed at a lower position of the retaining lever releasing portion 62. When the releasing portion 62 is pushed up by inserting a pin or the like into such a hole from the bottom surface of the expander, the retaining of the retaining lever can be released in case of emergency such as an erroneous operation or the like.

Figure 25:
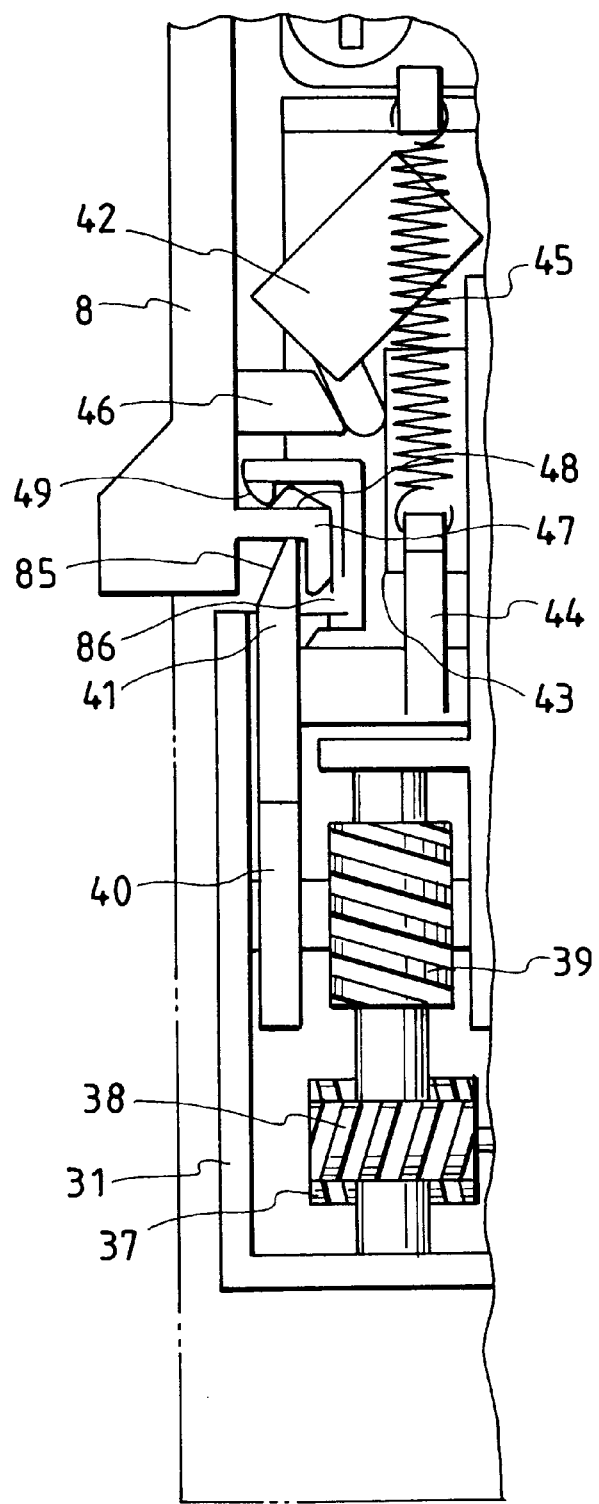
FIG. 25 is a diagram for explaining that a separation lever can be closed even in a state in which a retaining lever is locked in FIGS. 11 and 12.

As mentioned above, since the retaining lever 41 is retained to the receiving portion 47 of the edge of the separation lever, as compared with a case of retaining at a position near the rotational center of the separation lever, the retaining lever is more advantageous with respect to a strength and the separation lever can be locked without munching. Since a main mechanism of the movable claws 6, separation lever 8, retaining lever 41, and the like is constructed by a rotation system, it is hard to cause an inconvenience like a bite in a slide mechanism and a reliability of the operation is raised. FIGS. 24 and 25 show enlarged diagrams of the retaining lever portion. A tapered portion 85 is provided for the retaining lever 41 and a chamfered portion 86 is provided for the retaining portion 47 of the separation lever. After the emergency was released or at the time of some erroneous operation, there can be a case where the retaining lever 41 exists at the retaining position in an open state of the separation lever 8. In this state, when the separation lever 8 is tried to be closed, the chamfered portion 86 of the separation lever pushes the tapered portion 85 of the retaining lever. In this instance, the retaining lever 41 receives a component force in the releasing direction at the tapered portion 85. Thus, the retaining lever is forcedly shunted to the release position side against a force of the spring 45 and the separation lever is closed. That is, even after the retaining lever was held in the locked state due to an erroneous operation or the like, the main body and the expander can be combined.

Figure 16:
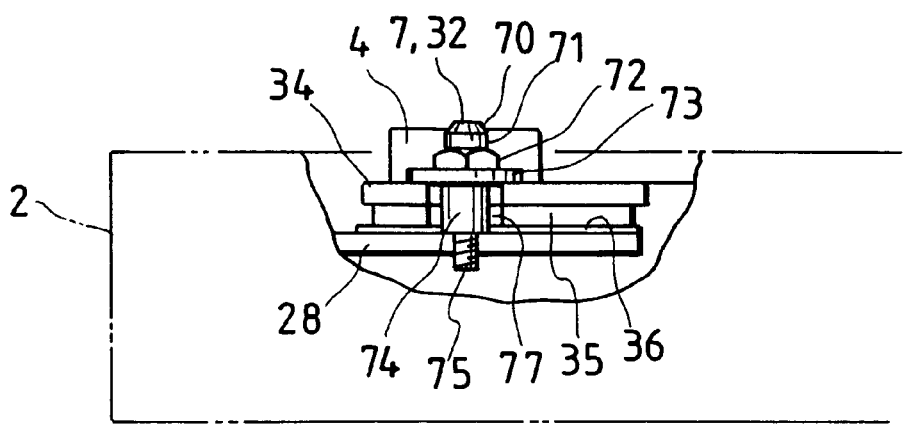
FIG. 16 is a diagram showing a state in which a connector board of the expander shown in FIG. 8 is attached so as to be movable by a micro distance by a screw with a flange.

An attaching method of the connector board will now be explained mainly with reference to FIGS. 8 and 16. The projection pen 7 and a screw 32 with a flange are integratedly formed. Reference numeral 70 denotes a pin tapered portion and 71 indicates a pin straight portion which is fitted into the hole 16 of the inserting portion of the main body. Reference numeral 72 denotes a hexagon portion for attaching; 73 a flange portion to prevent that the board is pulled out; 74 an axial portion; and 75 a screw portion. The connector 4 is fixedly provided for a board 34 and is movably connected to a main board of the expander by a flexible cable 33 (FIG. 8). A rubber damper 35 and a sliding sheet 36 are adhered by a both-sided adhesive tape or the like so as to move integratedly with the board 34. A hole portion 77 of a slightly large size is formed for the axial portion 74 of the screw with a flange. By the above structure, even if the positions of the main body and the expander are slightly deviated, the board absorbs the positional deviation and moves, so that a large load is not applied to the connector.

Figure 21:
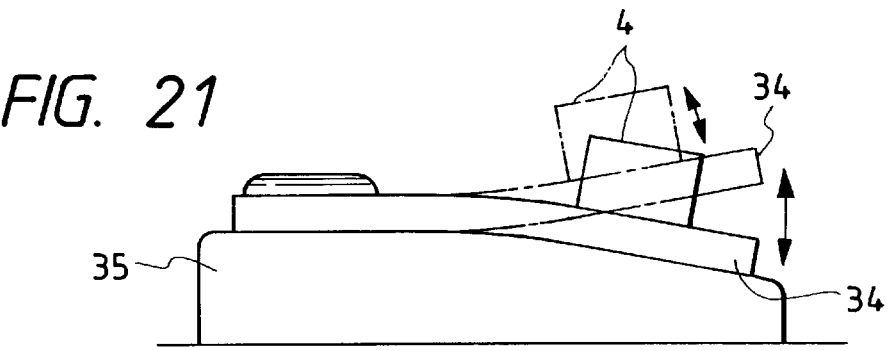
FIG. 21 is an explanatory diagram of an electronic apparatus of the prior art.

In the invention, further, since the screw with a flange is arranged on an extension line of the connector center on both sides of the connector, an inclination of the connector when it is inserted or pulled out can be reduced and reliability of the connector portion is improved. FIG. 21 shows a conventional example and the connector center and a holding position are deviated. When the connector is inserted or pulled out, a moment occurs and the board and the connector are inclined, so that it is apprehended that contact reliability and durability of terminals deteriorate.

Figure 17:
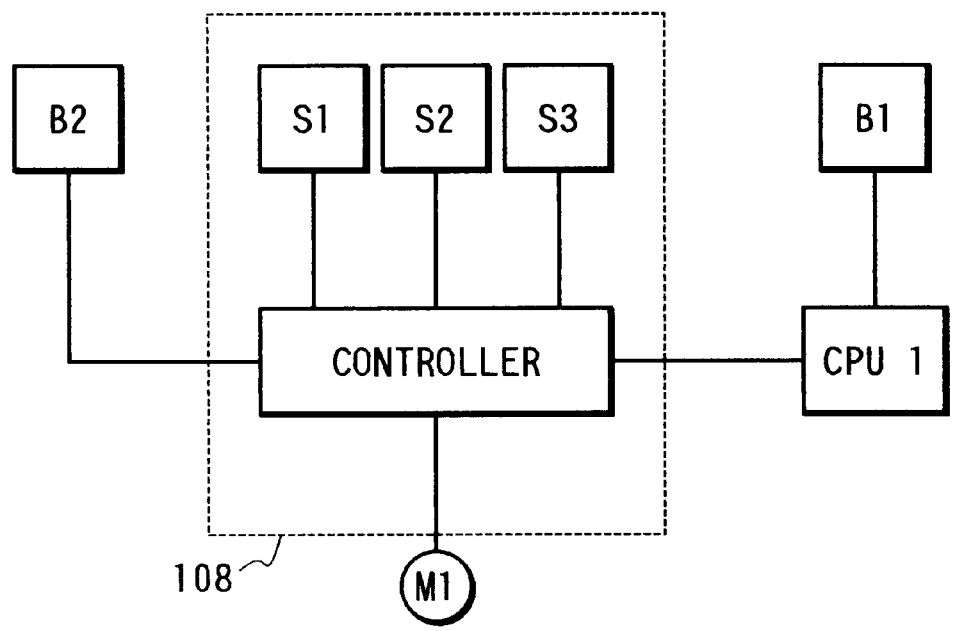
FIG. 17 is a block diagram of a control system of combination and separation of the main body and expander shown in FIG. 1.

An electronic lock control system to drive the retaining lever 41 will now be described. FIG. 17 is a block diagram. The main body has the CPU 1 to perform processes of the personal computer and a signal of release instructing means B1 such as lock release button or the like is connected to the CPU 1. The unlocking operation can be instructed by an input signal from a keyboard or a function of application software, or by any other methods. The expander has a controller. The controller monitors signals of a detection terminal S1 of the connector, a separation lever detection sensor S2, and a retaining lever detection sensor S3, controls the driving and stop of a motor M1, and discriminates a combining state, thereby deciding whether the expander is enabled to be processed or not. S2 denotes a separation lever sensor 42 (FIG. 8), S3 the retaining sensor 43, M1 the motor 30, and B2 a hardware-like release switch. When an inconvenience occurs on the system side, the locking state is unlocked by this switch. The separation lever sensor 42 is made operative by a sensor projecting portion 46 (FIG. 8) which projects toward the inside at a position near the edge on the separation side of the separation lever 8. When the separation lever 8 is closed, the separation lever sensor 42 is turned on.

Figure 18:
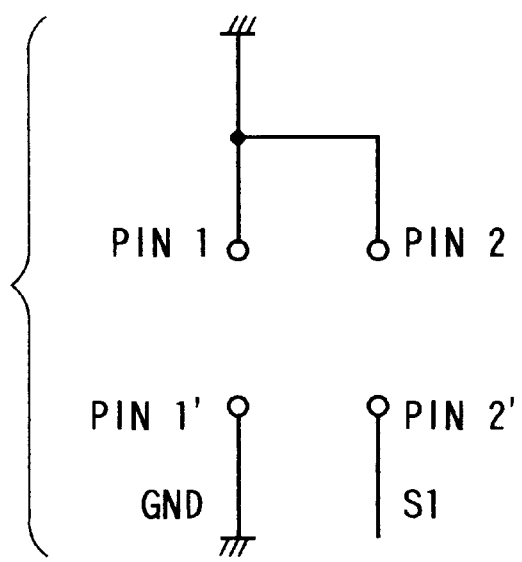
FIG. 18 is a diagram showing a detection example of a combining connector when connectors shown in FIGS. 3 and 4 are combined.

FIG. 18 is a diagram showing an example of the connection detection of the connector. Main body side connectors Pin1 and Pin2 are short-circuited to the ground GND. Apparatus side connectors Pin1' and Pin2' of the expander which faces the main body are set to the GND and the detection terminal S1. Ordinarily, an electric potential is applied to the terminal S1 and the GND is detected at the time of connection. The connection detection can also be connected by any other methods.

Figure 53:
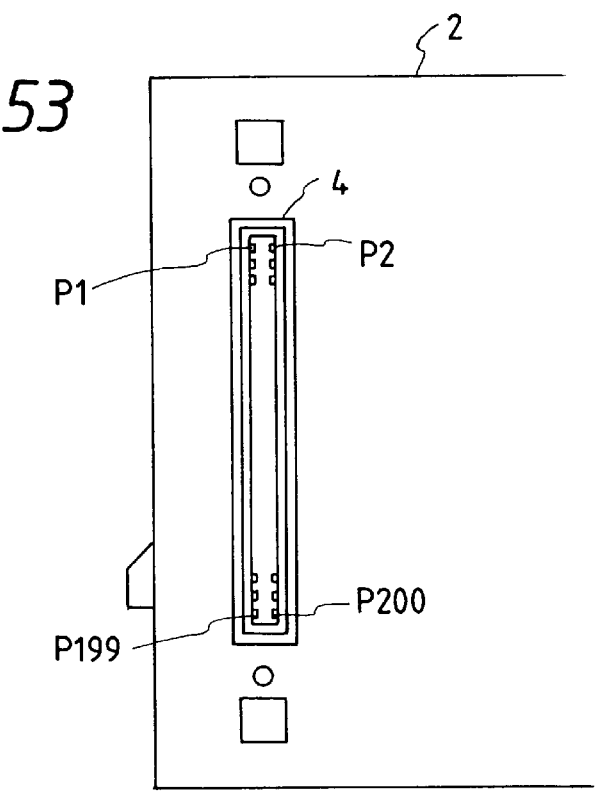
FIG. 53 is a diagram showing a connection detecting position of the connectors shown in FIGS. 1 and 3.
Figure 54:
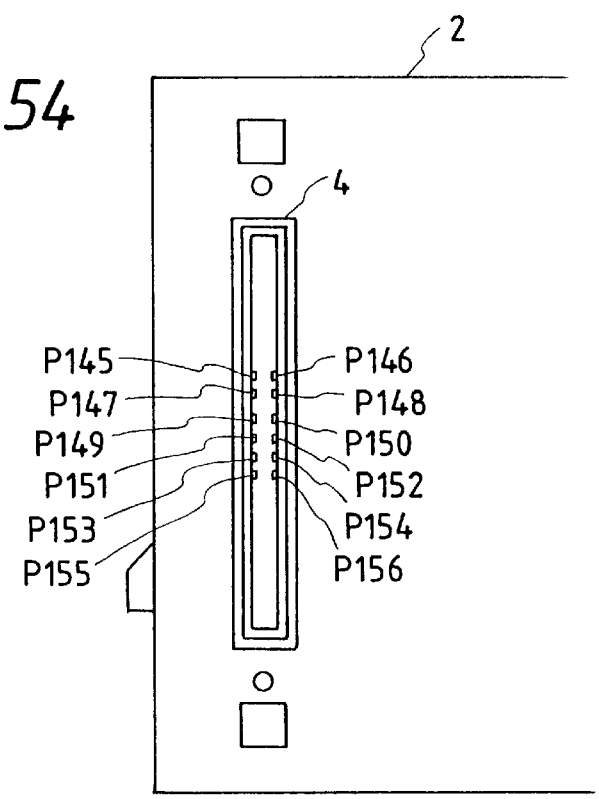
FIG. 54 is a diagram showing a connection detecting position of the connectors shown in FIGS. 1 and 3.

FIGS. 53 and 54 are diagrams showing connection detecting positions. There are 200 connecting terminals P1 to P200 and they are arranged in two lines.

In FIG. 53, (P1 and P2) and (P199 and P200) at both ends in the longitudinal direction of the connector denote connection detecting terminals. Whether the connector is correctly fitted without inclining or not can be discriminated. A layout position of the connection detecting terminals is not limited to a perfect layout of both ends. According to the experiments and examination of the present inventors, there is an effect in the discrimination of the inclination of the connector so long as the connection detecting terminals are allocated to the terminals in a range from the edge terminal to the terminal away therefrom by a distance of about ¼ of the whole length of the terminal train. The number of connection detecting terminals can be set to an arbitrary value.

In FIG. 54, (P145 and P146) and (P155 and P156) denote continuation detecting terminals. P147 to P154 denote power source terminals for supplying a power source between the main body and the expander. Since a relatively large current flows to the power source terminal, if the connection to the connector on the main body side is insufficient, a spark is generated between the main body side and the expander side and there is a fear such that the terminals are damaged. If the connection is detected at a position where the power source terminals are sandwiched, a connection reliability of the power source terminal is improved. There is an effect as the connection detecting terminals are closer to the power source terminals. When the connection detecting terminals are arranged at positions adjacent to the power source terminals, the largest effect is derived. The number of connection detecting terminals can be set to an arbitrary value. The number of positions of the power source terminals and the number of power source terminal groups can be set to arbitrary values.

Figure 19:
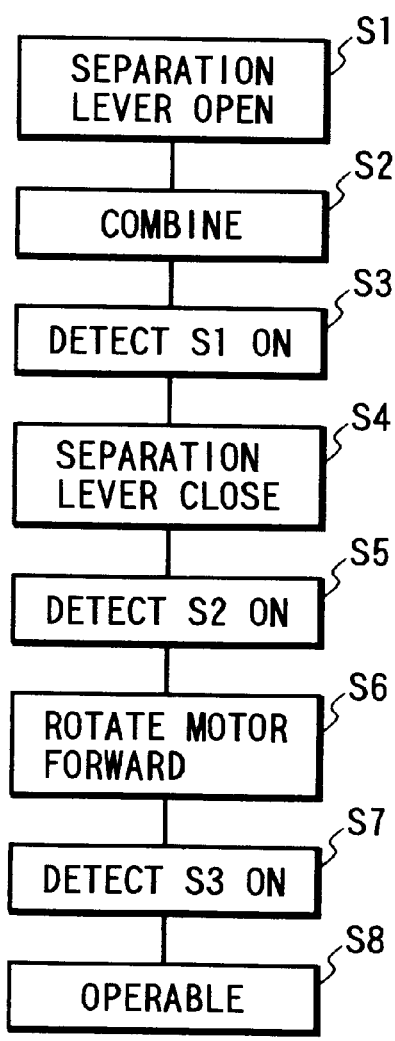
FIG. 19 is a flowchart at the time of the combination of the control system shown in FIG. 17.

FIG. 19 shows a flowchart when an electronic lock is applied. First, the separation lever is opened (step S1) and the movable claws 6 of the expander are moved to the positions upon combination, thereby combining the main body and the expander (step S2). The connectors of the main body and the expander are fitted and the coupling of the connectors is detected (S1: ON) (step S3). When the separation lever is subsequently closed (step S4), as shown in FIG. 8, the sensor projecting portion 46 of the separation lever turns on the separation lever sensor 42, thereby detecting that the separation lever is closed, namely, the movable claws are retained to the main body (S2: ON) (step S5). When it is detected that they have been combined in S1 and S2, the motor is driven, thereby retaining the retaining lever to the separation lever (step S6). When the retaining lever is retained, the retaining sensor S3 is turned on (step S7). The controller determines the completion of the locking (step S8). The controller enables processes between the CPU 1 of the main body and the devices of the expander which are not shown in the block diagram.

Figure 20:
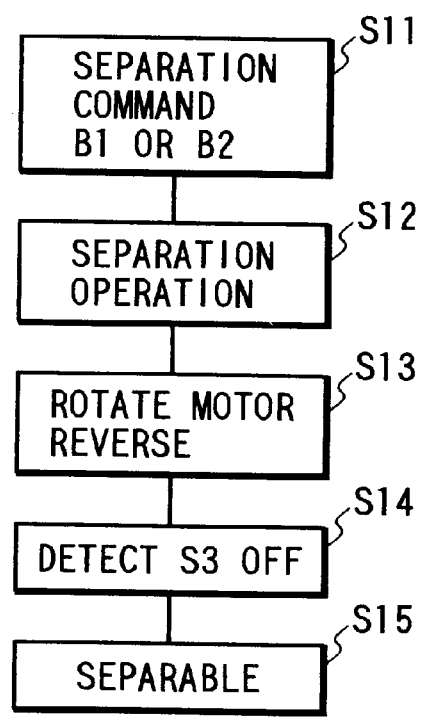
FIG. 20 is a flowchart at the time of the separation of the control system shown in FIG. 17.

FIG. 20 shows a flowchart for electronic unlocking. When there is an unlocking instruction by B1 or B2 (step S11), the CPU 1 and the controller cooperate, thereby performing a process to enable the main body and the expander to be separated (step S12). After completion of the process, the controller reversely rotates the motor (step S13). The retaining lever is rotated to the retaining release side and when the sensor S3 detects the release, the processing routine is finished (steps S14 and S15).

As mentioned above, by discriminating the combining state by three stages of the connection detection of the combining connectors, the detection of the mechanical lock of the combination, and the detection of the electronic lock, the main body and the expander can be certainly combined and an erroneous separation is prevented.

Figure 51:
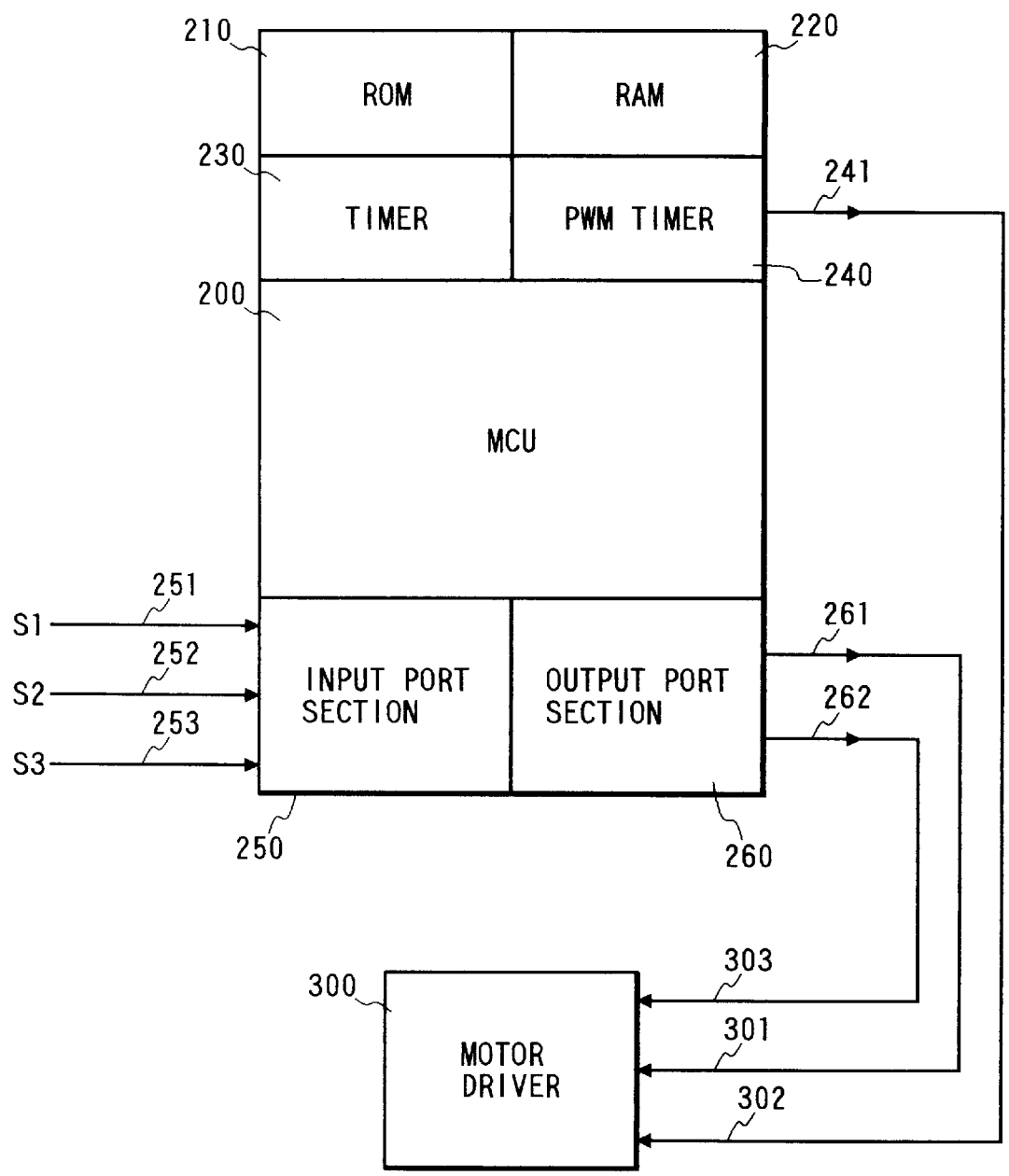
FIG. 51 is a detailed diagram of an example of a controller section shown in FIG. 17.

FIG. 51 is a detailed diagram of a controller section 108 (refer to FIG. 17). The motor driving operation will now be described in detail with reference to FIG. 51. In the diagram, reference numeral 200 denotes an MCU constructed by a one-chip microcomputer or the like. The MCU has an ROM 210, an RAM 220, a timer 230, a PWM timer 240, an input port section 250, an output port section 260, or the like.

The ROM 210 is a read only memory in which a program of the MCU 200 or various tables for motor control and the like have been stored. The RAM 220 is a random access memory which is used as a work area of the MCU 200. The timer 230 is used to form various control timings of the motor M1. The PWM timer 240 is a timer which is used for driving duty control of the motor M1 (motor 30). A PWM output terminal 241 is connected to a drive enable terminal 302 of a motor driver 300.

Reference numeral 250 denotes the input port section having input ports 251, 252, and 253 connected to the sensors S1, S2, and S3, respectively. Reference numeral 260 denotes the output port section having an output port 261 connected to a direction switching terminal 301 of the motor driver 300 and an output port 262 connected to a brake terminal 303 of the motor driver 300. The motor driver 300 drives the motor when a high level signal is inputted to the enable terminal 302. The motor driver 300 stops the driving of the motor when a low level signal is inputted.

The motor driver 300 has the direction switching terminal 301. When a high level signal is inputted to the terminal 301, the motor driver 300 forwardly rotates the motor. When a low level signal is inputted, the motor driver 300 reversely rotates the motor. When a high level signal is inputted to the brake terminal 303, the motor driver 300 brakes the motor M1. When a low level signal is inputted to the brake terminal 303, the motor driver 300 releases the braking of the motor. The motor is braked by using a counter electromotive force which is generated in a winding of the motor M1 by short-circuiting across the winding of the motor M1.

Figure 42:
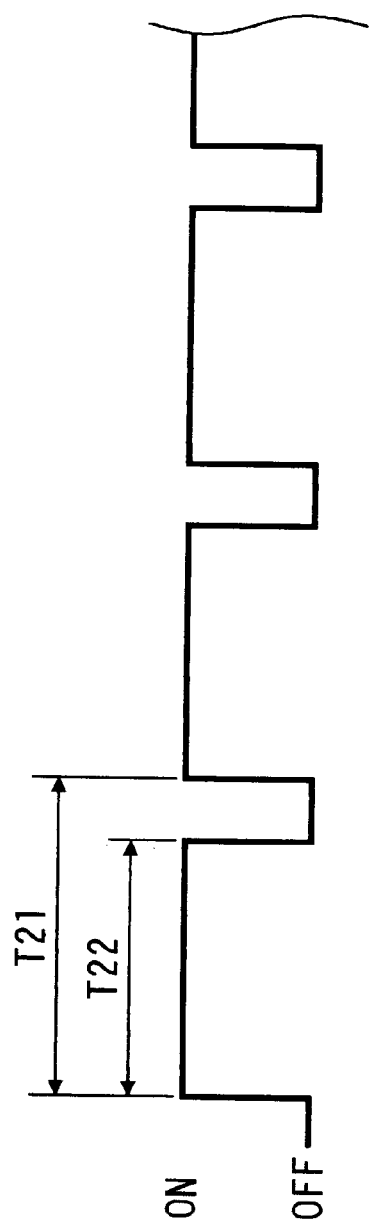
FIG. 42 is a diagram showing a duty of a soft chopper in the above example.
Figure 43:
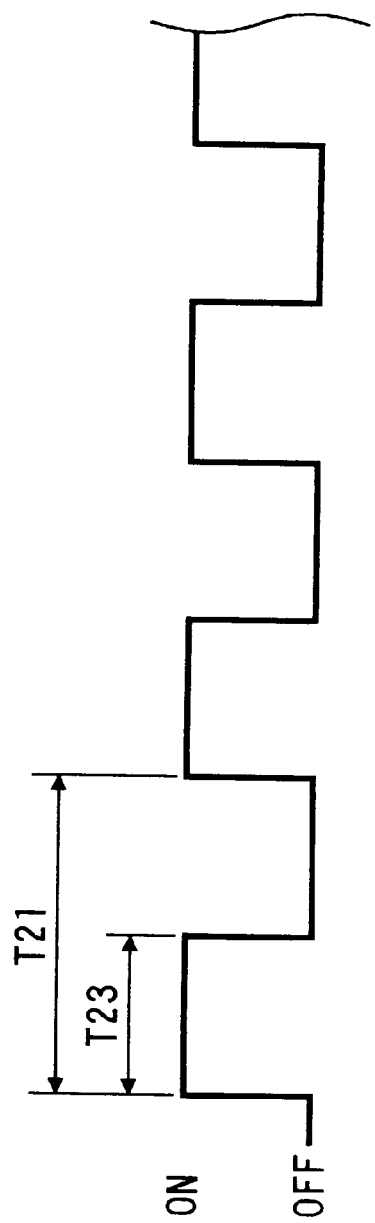
FIG. 43 is a diagram showing a duty of the soft chopper in the above example.
Figure 44:
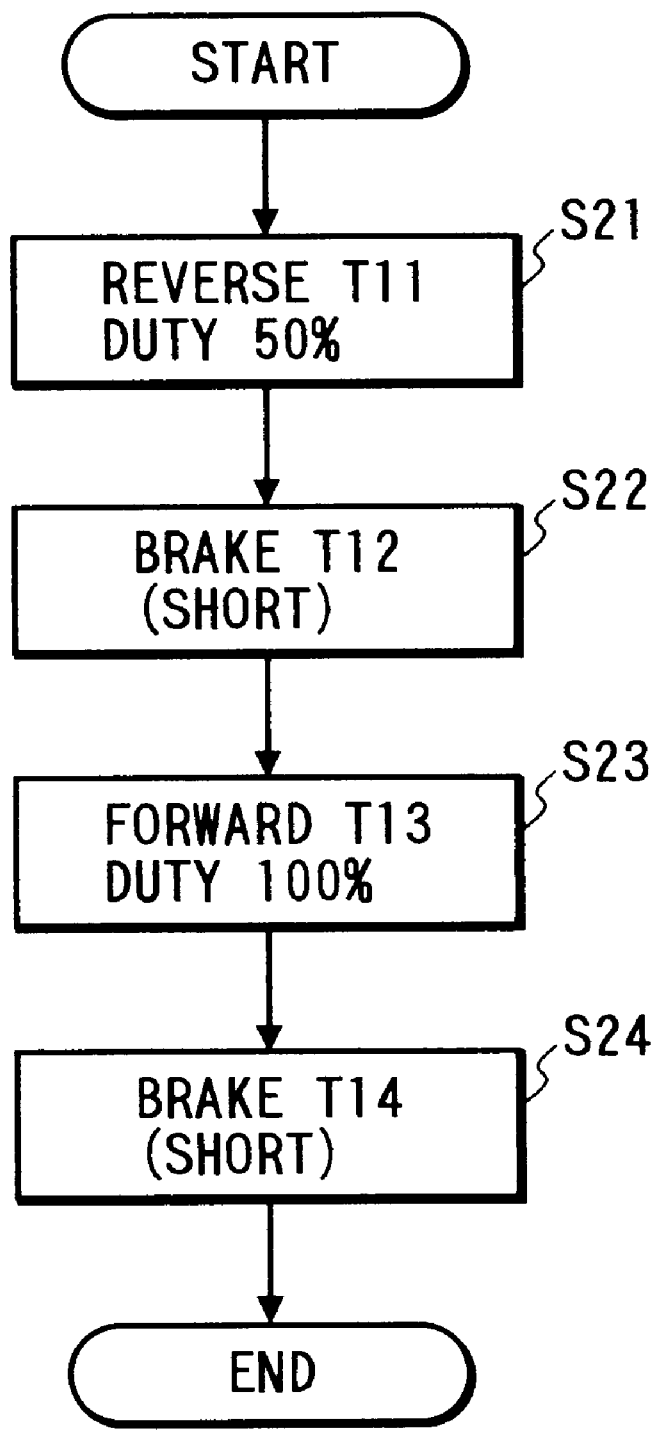
FIG. 44 is a flowchart for initialization in the above example.
Figure 45:
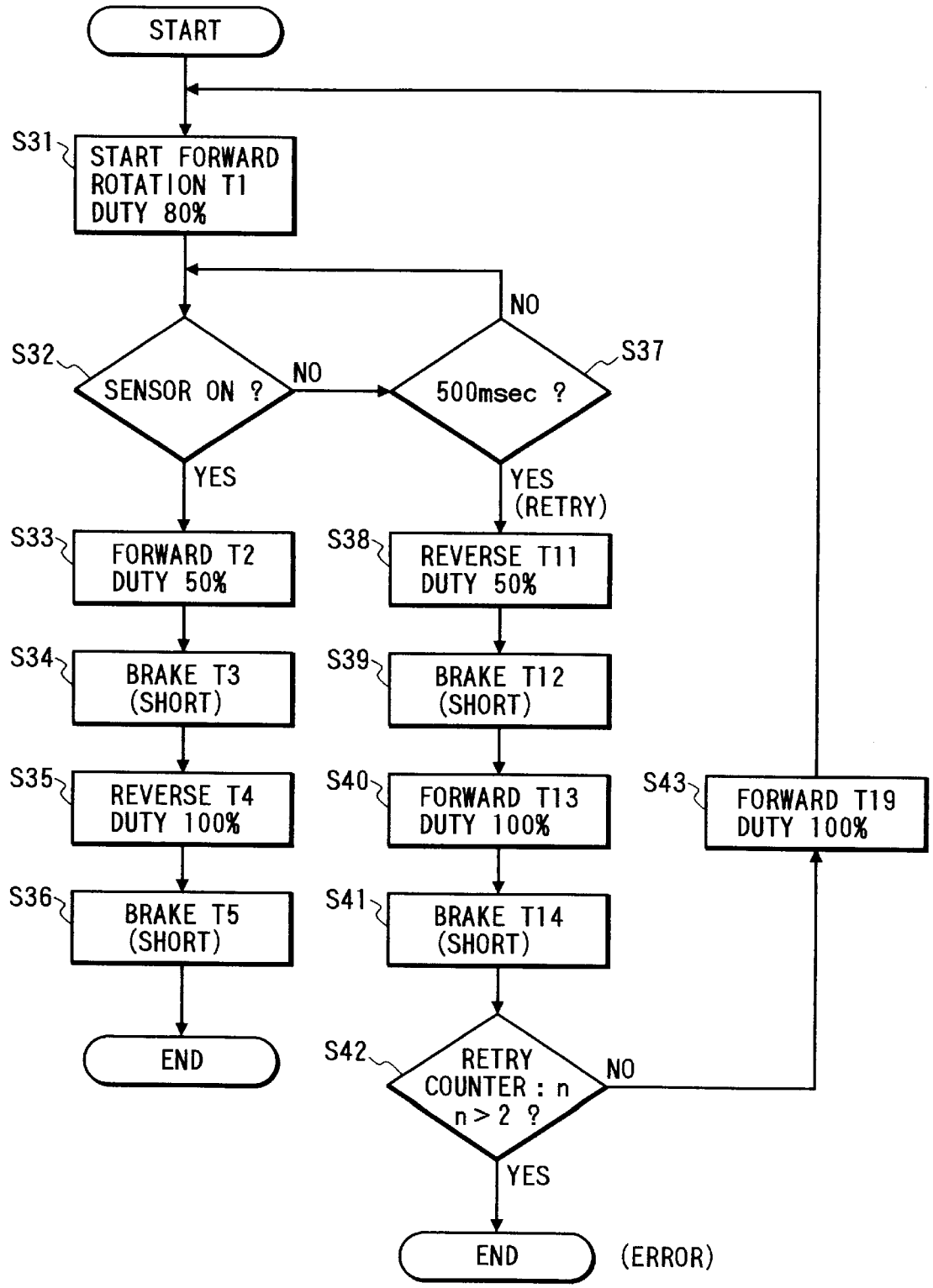
FIG. 45 is a flowchart at the time of locking in the above example.
Figure 46:
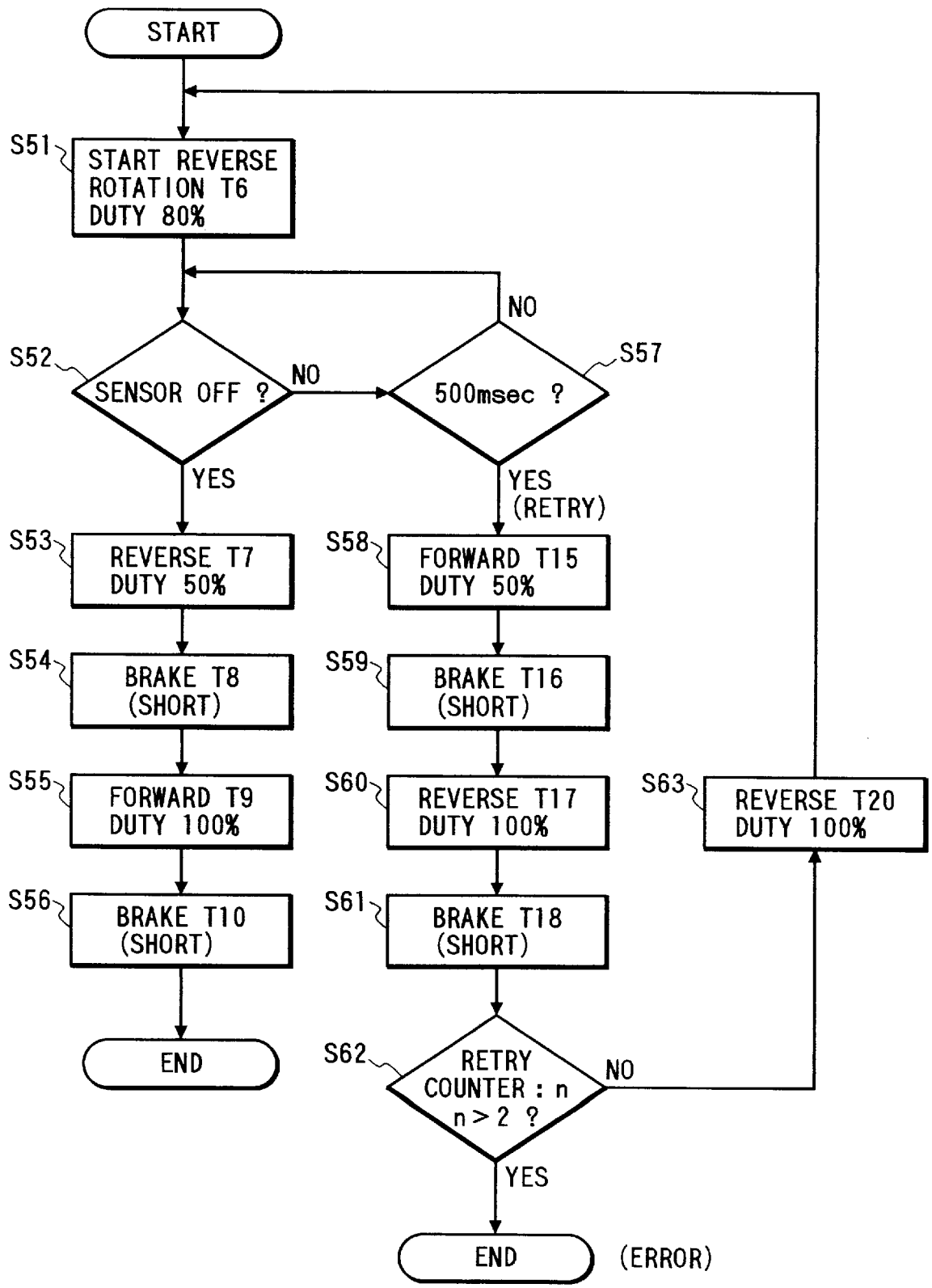
FIG. 46 is a flowchart at the time of locking release in the above example.

The driving of the motor will now be described in detail hereinbelow. FIGS. 30 to 35 show a sequence for a soft chopper driving. FIGS. 42 and 43 show driving duties. FIGS. 44 to 46 show flowcharts for the motor driving.

Figure 30:
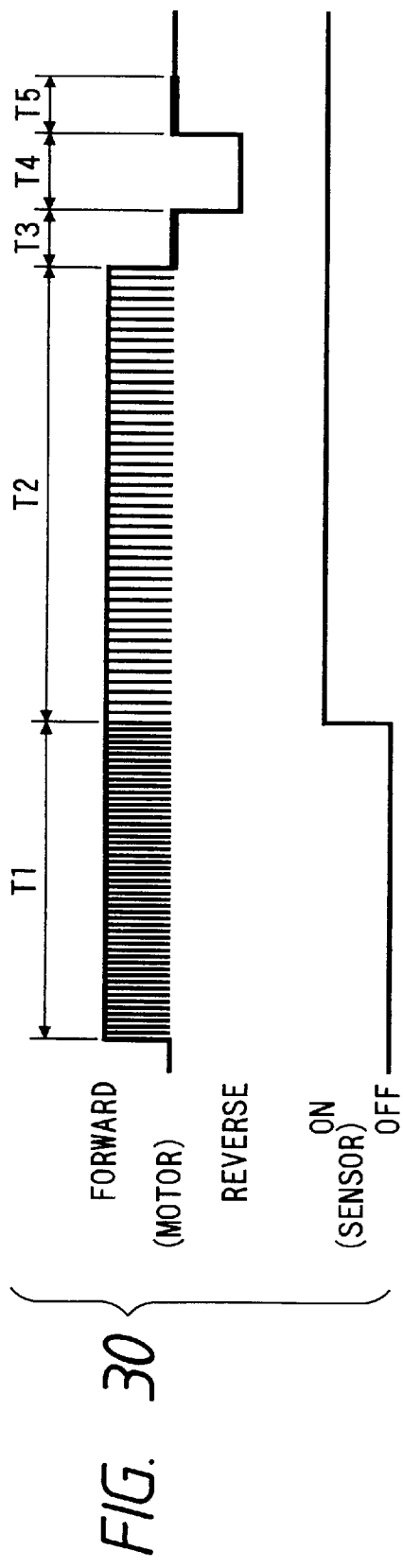
FIG. 30 is a diagram showing a motor driving sequence at the time of locking in an example of FIG. 51.

FIG. 30 shows a sequence upon locking. A drive signal and a forward rotation signal of a duty 80% are sent to the motor driver 300 and the forward rotation of the motor is started at a middle power. When the retaining sensor S3 is turned on, an almost locking state is derived. However, the motor is further rotated for a time T2 in order to certainly lock. As mentioned above, since the cam 40 comes into contact with the lock stopper 96 for a time T2, the motor is driven at a low power of a duty 50% so that a driving gear system is not strongly engaged. After the motor was braked at time T3, the motor is reversely rotated for a time of T4. The motor is braked at a time T5 and the sequence is finished. A reverse rotation at time T4 is driven at a high power of a duty 100% and releases the gear system from a weak engaging state.

Figure 31:
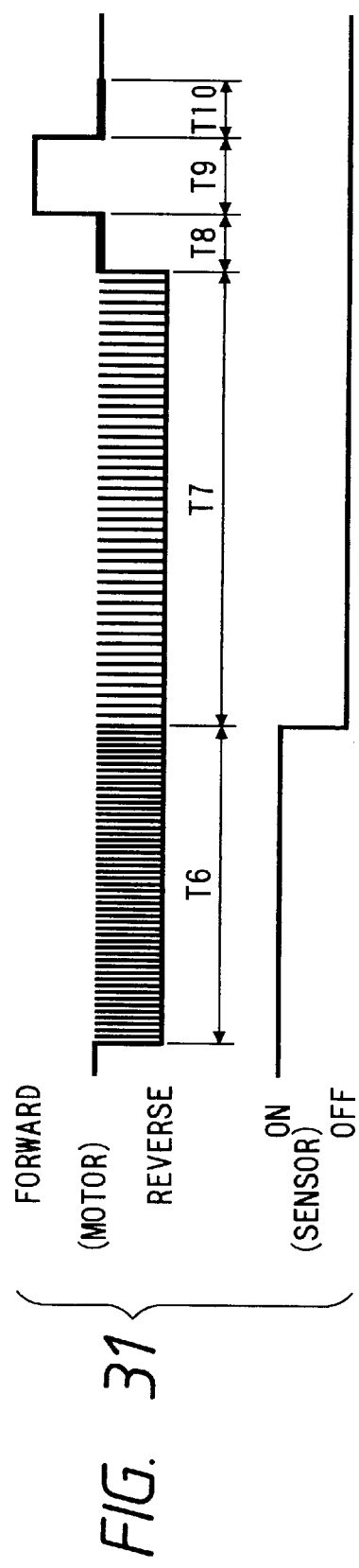
FIG. 31 is a diagram showing a motor driving sequence at the time of unlocking in the above example.

FIG. 31 shows a sequence at the time of release. The reverse rotation is started at a middle power of a duty 80%. After the off state of the retaining sensor was detected, a driving motor is switched to a low power driving of a duty 50% at time T7. The motor is braked at time T8, is forwardly rotated at time T9, and is braked at time T10, thereby finishing the sequence. The driving at time T9 is the high power driving of a duty 100% and releases a weak engaging state of the gear system which is caused since the cam 40 comes into contact with the release stopper 97 at time T7.

Figure 32:
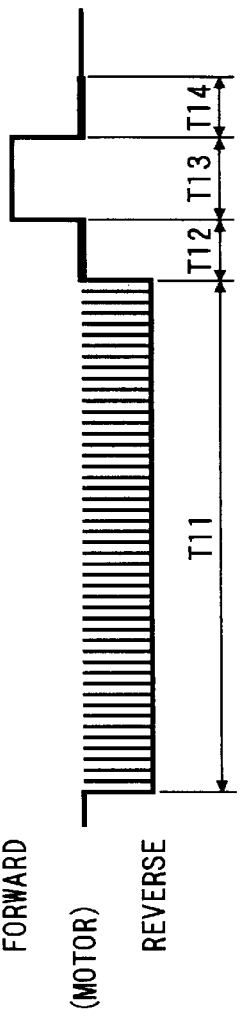
FIG. 32 is a diagram showing a motor driving sequence at the time of initialization and a locking retry in the above example.

FIG. 32 shows a motor driving mode at the time of the initial operation when a power source is turned on and at the time of a lock retry. The motor is reversely rotated at a low power of a duty 50%, is braked at T12, is forwardly rotated at time T13 by the driving of a duty 100%, is braked at time T14, and the sequence is finished. The retaining lever is returned to the release position. In case of the lock retry, after the elapse of T19 in FIG. 34, the locking sequence in FIG. 30 is executed. The driving at time T19 is a high power driving of a duty 100% and is performed to release an engaging state if the engaging of the gear system remains.

Figure 33:
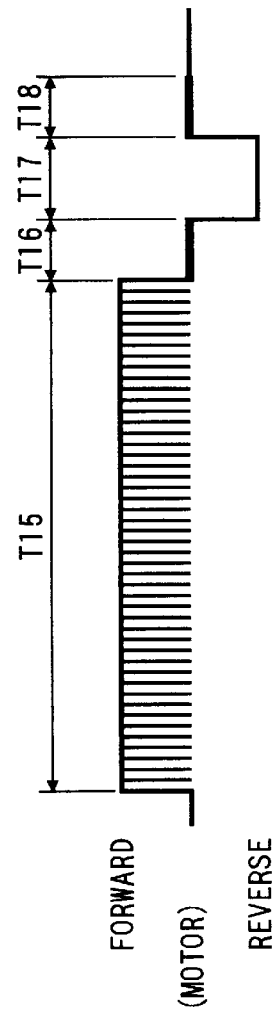
FIG. 33 is a diagram showing a motor driving sequence at the time of a locking release retry in the above example.
Figure 34:
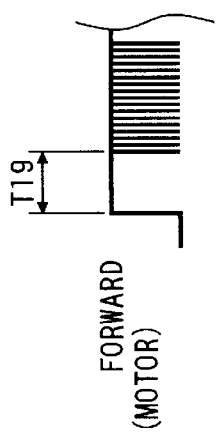
FIG. 34 is a diagram showing a motor driving sequence at the time of a locking retry in the above example.
Figure 35:
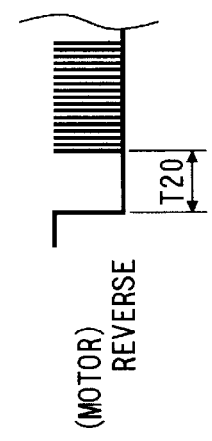
FIG. 35 is a diagram showing a motor driving sequence at the time of a locking release retry in the above example.

FIGS. 33 and 35 show a motor driving mode at the time of a lock release retry. The motor is forwardly rotated at a low power of a duty 50%, is braked at time T16, is reversely rotated at time T17 by a driving of a duty 100%, and is braked at time T18. The retaining lever is returned to the locking side. After that, as shown in FIG. 35, the motor is reversely rotated at time T20 by a driving of a duty 100%. Subsequently, a releasing sequence in FIG. 31 is executed.

FIGS. 42 and 43 show a duty of a soft chopper. For a period T21, T22 denotes a current supply time of 80% and T23 indicates a current supply time of 50%.

The above contents are shown in flowcharts of FIGS. 44 to 46. FIG. 44 is a flowchart for the initial operation. FIG. 45 is a flowchart upon locking. FIG. 46 is a flowchart upon lock release. As will be obviously understood from FIGS. 45 and 46, when the on or off state of the retaining sensor cannot be detected, the locking and lock release operation are retried twice.

Steps S21 to S24 shown in FIG. 44 indicate the processing steps for a time between T11 to T14 in FIG. 32.

Figure 38:
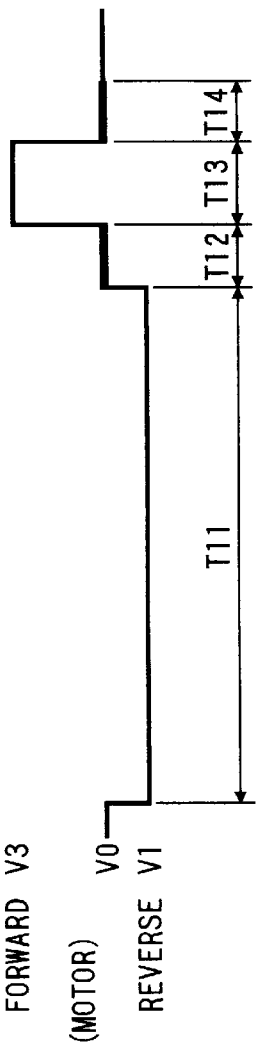
FIG. 38 is a diagram showing a motor driving sequence at the time of initialization and a locking retry in the above other example.

In the flow upon locking of FIG. 45, the forward rotation is started (T1: duty ratio is 80%) (step S31). A check is made to see if the sensor is ON (step S32). When the sensor is ON, steps S33 to S36 (T2 to T5 in FIG. 30) are executed. When the sensor is not ON, a check is made to see if a time of 500 msec has elapsed (step S37). After the elapse of 500 msec, the retry is started. Steps S38 to S41 (T11 to T14 in FIG. 38) are executed. After that, a check is made to see if the number of retry times is larger than 2 (step S42). When the number of retry times is equal to or less than 2, step S43 (forward rotation: T19, duty ratio of 100%) is executed. The processing routine is returned to step S31.

Figure 39:
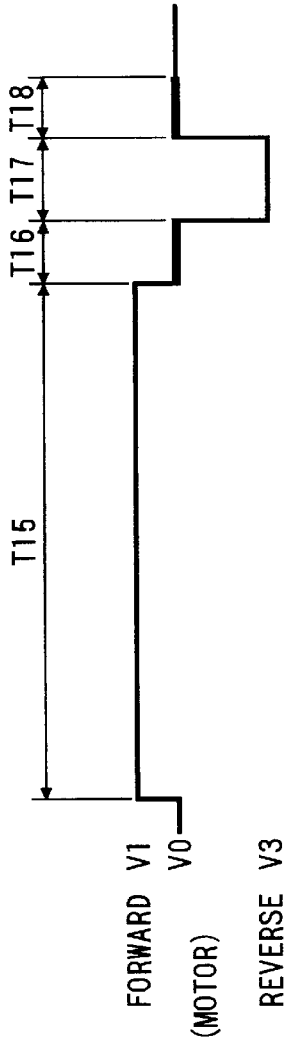
FIG. 39 is a diagram showing a motor driving sequence at the time of a locking release retry in the above other example.
Figure 40:
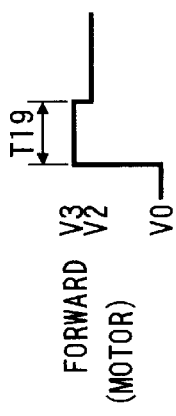
FIG. 40 is a diagram showing a motor driving sequence at the time of a locking retry in the above other example.
Figure 41:
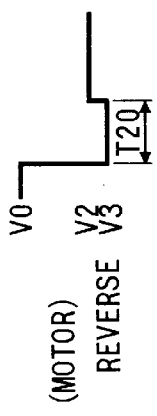
FIG. 41 is a diagram showing a motor driving sequence at the time of a locking release retry in the above other example.

In the flow upon unlocking in FIG. 46, the reverse rotation is started (T6: duty ratio of 80%) (step S51). Subsequently, a check is made to see if the sensor is OFF (step S52). When the sensor is OFF, steps S53 to S56 (T7 to T10 in FIG. 37) are executed. When the sensor is not OFF, a check is made to see if a time of 500 msec has elapsed (step S57). After the elapse of time of 500 msec, the retry is started. Steps S58 to S61 (T15 to T18 in FIG. 39) are executed. After that, a check is made to see if the number of retry times is larger than 2 (step S62). When the number of retry times is equal to or less than 2, step S63 (reverse rotation, T20: duty ratio 100%) is executed. The processing routine is returned to step S51.

Figure 52:
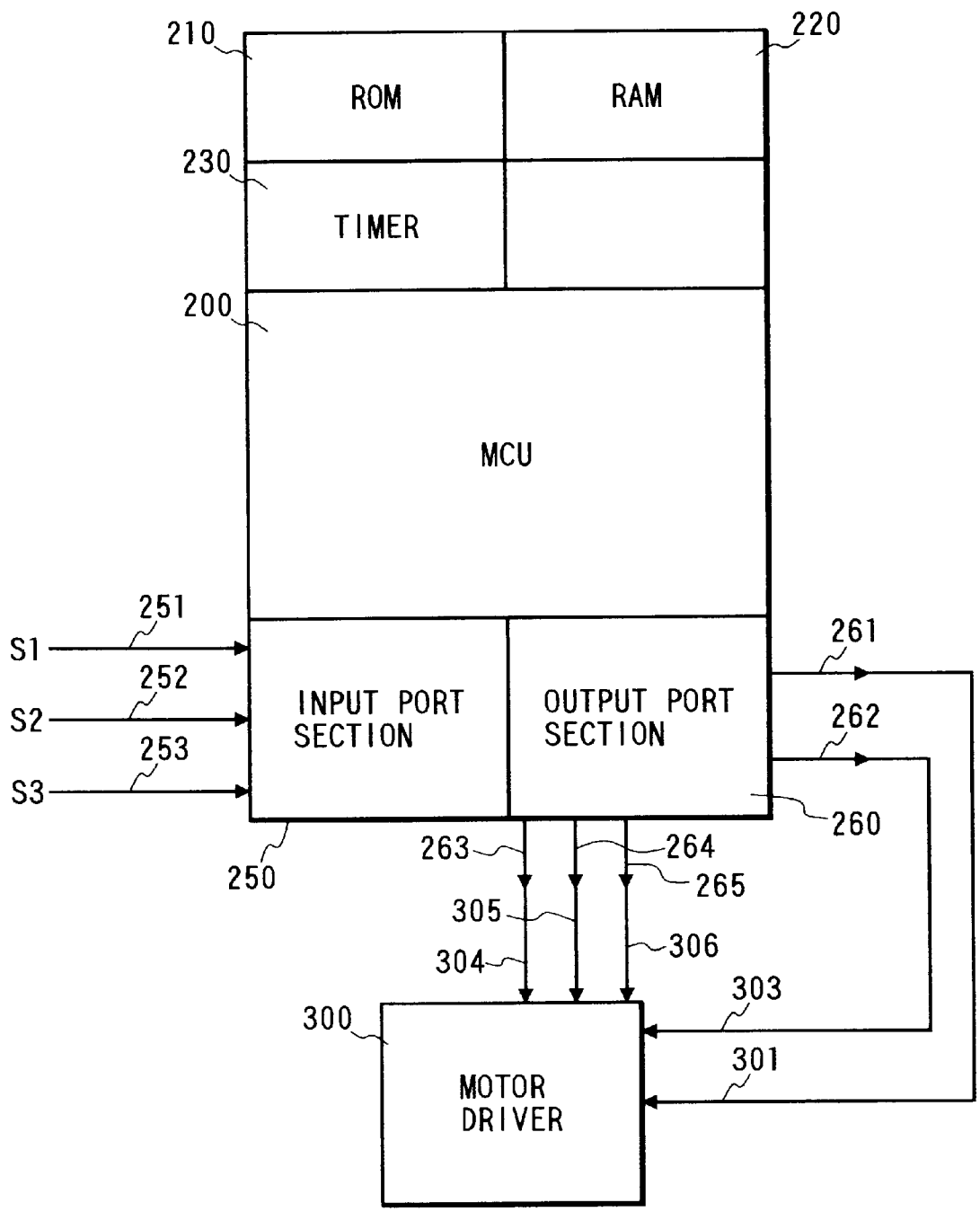
FIG. 52 is a detailed diagram of another example of a controller section shown in FIG. 17.

Further, as a method of driving the motor, the driving voltage of the motor can be also set to multiple levels. FIG. 52 shows a controller section. FIG. 52 differs from a construction of FIG. 51 with respect to a point that in place of a soft chopper signal, output ports 263, 264, and 265 are connected to input terminals 304, 305, and 306 of the motor driver 300. When a high level signal is inputted to the terminal 304, the motor is driven by a low voltage V1. When a high level signal is inputted to the terminal 305, the motor is driven by a middle voltage. When a high level signal is inputted to the terminal 306, the motor is driven by a high voltage V3. FIGS. 36 to 41 show a sequence for a variable voltage driving. FIGS. 36 to 41 correspond to FIGS. 30 to 35, respectively. An operation object of T1 to T20 shown in FIGS. 36 to 41 are the same as that in the example of the soft chopper driving. In the description of the soft chopper driving, when the driving of a duty 100% is replaced to the driving by the high voltage V3 and the driving of a duty 80% is replaced to the driving by the middle voltage V2 and the driving of a duty 50% is replaced to the driving by the low voltage V1, an explanation of the embodiment is substantially the same as that while including flowcharts FIGS. 44 to 46.

As an example, the operation upon locking will now be described with reference to FIG. 36. The motor is forwardly rotated at time T1 by the middle voltage V2. When the ON state of the retaining sensor is detected, the motor is driven at time T2 by the low voltage V1, is braked at time T3, and is reversely rotated by the high voltage V3. The braking is finished at time T5. In the latter half of the driving, the motor is driven by a small driving force, the power is reduced, an extent of the engagement of the gear system is suppressed, and the engagement is finally released by a large driving force, thereby preparing for the next operation.

Figure 22:
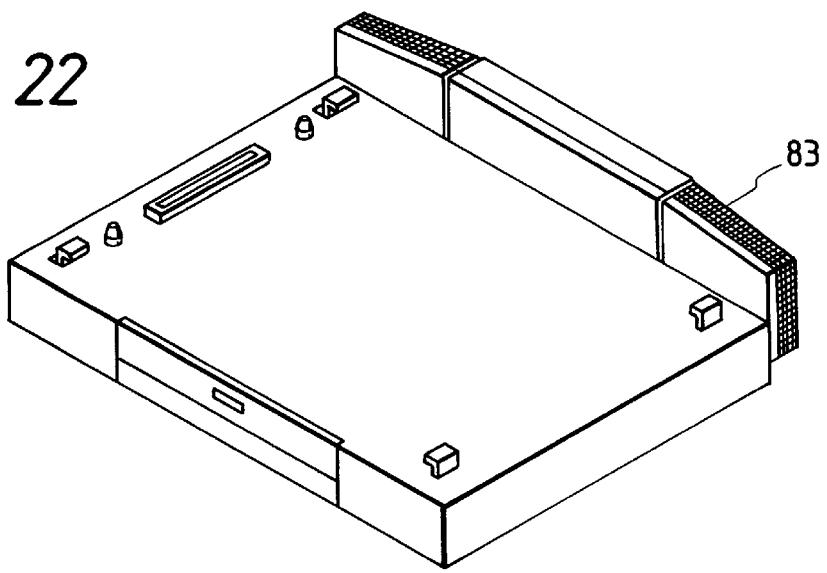
FIG. 22 is a perspective view of an expander showing another embodiment of the invention.
Figure 23:
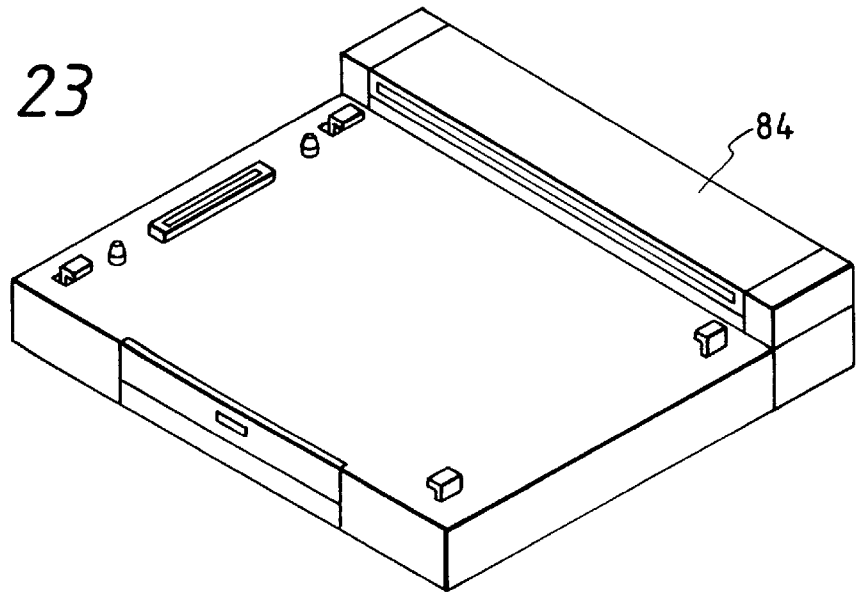
FIG. 23 is a perspective view of an expander showing still another embodiment of the invention.

In the invention, functions which the main body and the expander have are not limited to those of the above embodiment. For example, as an expander, it is possible to use an expander in which a speaker unit 83 is installed to provide a sound function as shown in FIG. 22, an expander with a printing function having a built-in printer 84 as shown in FIG. 23, or the like.

According to the invention as described above, in an electronic apparatus which is detachably combined, a detachable mechanism in which a good attaching/detaching operability is obtained and a combining reliability is high and which contributes to realize a compact size can be realized. An electronic apparatus having a high portability and a high combining reliability upon carrying is derived.

Further, the separation lever (operating member) to combine and separate the main body and the expander is provided, the retaining member for locking the separation lever in the combined state, and the means for discriminating the coupling state of the main body and the expander on the basis of a position detection signal of the separation lever, the position signal of the retaining member, and the connection detection signal of the connector are provided. Since the main body and the expander are electrically connected when they are certainly combined, a defective operation of the apparatus which is caused due to a defective connection doesn't occur.

Further, the connection of the connectors is detected by connecting terminals near both ends in the longitudinal direction of the combined connectors. Whether the connectors are inclined in the longitudinal direction and an incomplete fitting is made or not can be confirmed, so that a reliability of the connection detection is raised.

Further, the connection detecting terminals are provided at positions which sandwich the power source terminals of the connector. A situation such that a spark is generated between the terminals in an insufficient connecting state and a defective terminal state occurs can be avoided.

Further, the movable claws which are interlocked to the separation lever are provided and are constructed so as to become into engagement with the main body. The motion of the separation lever can be blocked by the retaining lever in the combined state. The combined state can be certainly held by a simple operation.

What is claimed is:

1. A portable electronic apparatus, comprising:

a main body;

an expander detachably attached to said main body;

an engaging portion provided on one end of an upper surface of said expander;

a movable engaging portion provided on another end of said upper surface of said expander;

a first connector provided adjacent to said movable engaging portion on said upper surface of said expander;

a first engagement receiving portion provided at one end of a bottom of said main body and serving as a receptor for said engaging portion;

a second engagement receiving portion provided at another end of said bottom of said main body and serving as a receptor for said movable engaging portion;

a second connector provided adjacent to said second engagement receiving portion of said bottom of said main body and connected to said first connector; and an opening/closing member for allowing said movable engaging portion to move, said opening/closing member allowing said expander to be detached from said main body by moving said movable engaging member to an open position and attaching said expander and said main body with portable properties by moving said movable engaging member to a closed position.

2. An electronic apparatus, comprising:

a main body;

an expander detachably attached to said main body;

an engaging portion provided on one end of an upper surface said expander;

a movable engaging portion provided on another end of said upper surface of said expander;

a first connector provided adjacent to said movable engaging portion on said upper surface of said expander;

a first engagement receiving portion provided at one end of a bottom of said main body and serving as a receptor for said engaging portion;

a second engagement receiving portion provided at another end of said bottom of said main body and serving as a receptor for said movable engaging portion;

a second connector provided adjacent to said second engagement receiving portion of said bottom of said main body and connected to said first connector; and an opening/closing member for allowing said movable engaging portion to move, said opening/closing member allowing said expander to be detached from said main body by moving said movable engaging member to an open position and attaching said expander and said main body by moving said movable engaging member to a closed position, wherein said movable engaging portion comprises movable claws and a movable claw main body having said movable claws, said opening/closing member integratedly forms a cam portion around a rotational center of said opening/closing member, and said opening/closing member makes said movable claw main body movable when said cam portion is made operative by the movable operation of said opening/closing member.

3. An electronic apparatus comprising:

a main body;

an expander detachably attached to said expander;

an engaging portion provided on one end side of an attaching portion of said expander;

a movable engaging portion provided on the other end side of said attaching portion of said expander;

a first connector provided at a position adjacent to said movable engaging portion of said attaching portion of said expander;

a first engagement receiving portion provided on one end side of an attaching portion of said main body and receiving said engaging portion;

a second engagement receiving portion provided on the other end side of said attaching portion of said main body and receiving said movable engaging portion;

a second connector provided at a position adjacent to said second engagement receiving portion of said attaching portion of said main body and connected to said first connector;

an opening/closing member for making said movable engaging portion movable, making said expander and said main body detachable by a movable operation to an opening position, and attaching and holding said expander and said main body by a movable operation to a closed position;

first detecting means for detecting an operating state of said opening/closing member;

a retaining member for blocking movement of said opening/closing member at the closed position to the opening position;

second detecting means for detecting a position of said retaining member; and discriminating means for discriminating an attaching state of said expander and said main body on the basis of a connection signal generated when said first and second connectors are connected and detection signals of said first and second detecting means, wherein said first connector of said attaching portion of said expander is provided for a connecting connector board, and said connecting connector board is installed so as to be adjustably movable.

4. An electronic apparatus, comprising:

a main body;

an expander to which said main body is detachably attached;

an engaging portion provided on one end side of an attaching portion of said expander;

a movable claw main body provided on the other end side of said attaching portion of said expander and having movable claws and a cam follower;

a first connector provided adjacent to said movable claws of said attaching portion of said expander;

a first engagement receiving portion provided on one end side of an attaching portion of said main body and receiving said engaging portion;

a second engagement receiving portion provided on the other end side of said attaching portion of said main body and receiving said movable claws;

a second connector provided adjacent to said second engagement receiving portion of the attaching portion of said main body and connected to said first connector; and an opening/closing member for making said movable engaging portion movable, said opening/closing member having a cam adapted to come into engagement with said cam follower, making said movable claws movable through said cam and said cam follower by an operation to an opening position to thereby enable said expander and said main body to be detached, and making said movable claws movable through said cam and said cam follower by an operation to a closed position to thereby attach and hold said expander and said main body.

5. An electronic apparatus, comprising:

a main body;

an expander detachably connected to said main body;

a claw main body having a pair of movable claws in both end upper portions and a cam follower in a center portion side portion and attached to said expander so as to be rotatable around a horizontal axial line as a center;

an opening/closing lever having a cam with one end attached to said expander so as to be rotatable around a vertical axial line as a center and is set to a closed position and an opening position and the other end constructs a retaining portion for said expander and operates around said vertical axial line as a center and comes into engagement with said cam follower, wherein by opening said opening/closing lever, said claw main body is rotated to thereby allow said pair of movable claws to be moved to a detaching position from said main body, and by closing said opening/ closing lever, said claw main body is rotated to thereby allow said pair of movable claws to be moved to an attaching position with said main body.

6. An apparatus according to claim 5, wherein said opening/closing lever can be set to a position which is further opened than said opening position, said opening/ closing lever further has another cam and a flexible separation cap which is partially sandwiched by said another cam at said further opening position and pushes up said main body and is separated from said expander.

7. An apparatus according to claim 5, further comprising:

a retaining lever for retaining a retaining portion of said opening/closing lever, said retaining lever set to an engaging position where it comes into engagement with said retaining portion of said opening/closing lever and a release position where it is away from said retaining portion of said opening/closing lever; and a reversible motor for driving said retaining lever, and said retaining lever is moved to said retaining position or release position in dependence on a rotating direction of said reversible motor.

8. An apparatus according to claim 5, wherein said main body further has a first connector, said expander further has a second connector which is connected to said first connector of said main body, and further comprising combination detection signal generating means for detecting a combining state when said first and second connectors are connected and generating a combination detection signal and a retaining lever for retaining said retaining portion of said opening/ closing lever, said retaining lever is set to a retaining position where it comes into engagement with said retaining portion of said opening/closing lever and a release position where it is away from the retaining portion of said opening/ closing lever, a reversible motor for driving said retaining lever, said retaining lever is set to the retaining position or release position in dependence on a rotating direction of said reversible motor, closed state detection signal generating means for detecting that said opening/closing lever is in a closed state and generating a closed state detection signal, and retaining detection signal generating means for detecting a state in which said retaining lever is retained, generating a retaining detection signal, detecting a state in which said retaining lever is separated, and generating a separation detection signal.

9. An apparatus according to claim 8, wherein when said main body and said expander are connected, the combination detection signal is generated from said combination detection signal generating means, and after it is detected that the closed state detection signal is generated from said closed state detection signal generating means, and said retaining lever is moved to said retaining position by said reversible motor, thereby enabling a state in which the connection of said main body and said expander is completed when said retaining detection signal generating means generates the retaining detection signal.

10. An apparatus according to claim 8, further having separation instruction signal generating means for generating a separation instruction signal to instruct a separation of said main body and said expander, and wherein when the main body and the expander are disconnected, in accordance with the separation instruction signal generated from said separation instruction signal generating means, said retaining lever is moved to the separating position by said reversible motor, thereby enabling a separable state to be discriminated when said retaining detection signal generating means generates the separation detection signal.

11. An electronic apparatus, comprising:

a main body;

an expander detachably connected to said main body;

an operating member for connecting and disconnecting said main body and said expander;

engaging means for engaging said main body and said expander;

retaining means which can block a motion of said operating member;

a first connector provided for said main body;

a second connector, provided for said expander, for connecting to said first connector;

first detecting means for detecting a position of said operating member and generating a first detection signal;

second detecting means for detecting a position of said retaining member and generating a second detection signal;

third detecting means for detecting a connection of said first and second connectors and generating a third detection signal; and means for discriminating a connecting state of said main body and said expander by said first, second, and third detection signals, wherein said third detecting means is located near both ends in the longitudinal direction of said first and second connectors.

12. An electronic apparatus, comprising:

a main body;

an expander detachably connected to said main body;

an operating member for connecting and disconnecting said main body and said expander;

engaging means for engaging said main body and said expander;

retaining means which can block a motion of said operating member;

a first connector provided for said main body;

a second connector, provided for said expander, for connecting to said first connector;

first detecting means for detecting a position of said operating member and generating a first detection signal;

second detecting means for detecting a position of said retaining member and generating a second detection signal;

third detecting means for detecting a connection of said first and second connectors and generating a third detection signal; and means for discriminating a connecting state of said main body and said expander by said first, second, and third detection signals, wherein said third detecting means is located so as to sandwich power supply terminals of said first and second connectors.

13. A portable electronic apparatus, comprising:

a main body;

an expander;

an operating member which can be set to at least a first position for connecting said main body and said expander and a second position for disconnecting said main body and said expander;

a movable engaging member which can be set to at least a connecting position and a disconnecting position with said main body in an interlocking relation with said operating member; and a retaining member which can block motion of said operating member when said operating member exists at the first position, with the movement of said operating member being limited by said engaging member at the first position and connecting said expander and said main body.

14. An electronic apparatus comprising:

a main body;

an expander combinable with said expander;

an operating member with a cam portion and set to at least a first position for combination and a second position for separation; and a movable member having a cam follower portion adapted to be come into contact with said cam, wherein said movable member is deformed in accordance with an operation amount of said operating member, said movable member is set to at least a first displacement position and a second displacement position corresponding to said first and second positions of said operating member, and said cam is formed such that a lift profile of said cam which comes into contact with said cam follower portion has an inverse tapered shape at a position just before said operating member is deformed to said first position.

15. An apparatus according to claim 14, wherein said movable member is a combination engaging member for combining and holding said main body and said expander.

16. An electronic apparatus comprising:

a main body;

an expander separably combinable with said main body;

an operating member set to at least a first position for combining said main body and said expander and a second position for separating said main body and said expander; and a retaining member which can block a motion of said operating member when said operation member is at the first position, wherein said retaining member can be set to a locking position where it blocks the motion of said operating member and a release position where it does not block the motion of said operating member, and an inclined portion for enabling the movement of said operating member provided on at least one of said locking member and said operating member when said operating member is moved from a second position to a first position in a state that said locking member is at a locked position and said operating member is at the second position.

17. An electronic apparatus, comprising:

a main body;

an expander separably combinable with said main body;

an operating member for combining and separating said main body and said expander;

a retaining member which can block motion of said operating member in a combining state, said retaining member being set to a position where it blocks motion of said operating member and a position where it does not block the motion of said operating member; and driving means for driving said retaining member, wherein a driving state in a driving step of said retaining member is variably controlled, and wherein a driving force of said driving means is variably controlled.

18. An electronic apparatus, comprising:

a main body;

an expander separably combinable with said main body;

an operating member for combining and separating said main body and said expander;

a retaining member which can block motion of said operating member in a combining state, said retaining member being set to a position where it blocks motion of said operating member and a position where it does not block the motion of said operating member; and driving means for driving said retaining member, wherein a driving state in a driving step of said retaining member is variably controlled, and wherein said retaining member is driven by a first driving force during a first half of driving time of said driving means and is driven by a second driving force during a second half of driving time.

19. An electronic apparatus, comprising:

a main body;

an expander separably combinable with said main body;

an operating member for combining and separating said main body and said expander;

a retaining member which can block motion of said operating member in a combining state, said retaining member being set to a position where it blocks motion of said operating member and a position where it does not block the motion of said operating member;

driving means for driving said retaining member, wherein a driving state in a driving step of said retaining member is variably controlled, and detecting means for detecting a position of said retaining member, and wherein after a detection signal of said detecting means is changed, the driving force of said driving means is switched.

20. An electronic apparatus, comprising:

a main body;

an expander separably combinable with said main body;

an operating member for combining and separating said main body and said expander;

a retaining member which can block motion of said operating member in a combining state, said retaining member being set to a position where it blocks motion of said operating member and a position where it does not block the motion of said operating member; and driving means for driving said retaining member, wherein a driving state in a driving step of said retaining member is variably controlled, wherein the driving force of said driving means is made variable by variably controlling a driving voltage of said driving means.

21. An electronic apparatus, comprising:

a main body;

an expander separably combinable with said main body;

an operating member for combining and separating said main body and said expander;

a retaining member which can block motion of said operating member in a combining state, said retaining member being set to a position where it blocks motion of said operating member and a position where it does not block the motion of said operating member; and driving means for driving said retaining member, wherein a driving state in a driving step of said retaining member is variably controlled, wherein said driving means is a motor, and further comprising a retaining detecting sensor for detecting that said retaining member is retained to said operating member, and when said retaining member is locked to said operating member, said driving means drives said motor at least to a prescribed position where said retaining detector sensor is made operative, and after that, a check is made by said sensor to see if the retaining of said retaining member to said operating member has been detected, and when it is detected, a locking operation is continued, and when it is not detected, a retry operation is performed.

22. An electronic apparatus, comprising:

a main body;

an expander separably combinable with said main body;

an operating member for combining and separating said main body and said expander;

a retaining member which can block motion of said operating member in a combining state, said retaining member being set to a position where it blocks motion of said operating member and a position where it does not block the motion of said operating member; and driving means for driving said retaining member, wherein a driving state in a driving step of said retaining member is variably controlled, wherein said driving means is a motor, and further comprising a retaining detecting sensor for detecting that said retaining member is retained to said operating member is further provided, and when said retaining member is unlocked from said operating member, said driving means drives said motor at least to a prescribed position where said retaining detecting sensor is made operative, and after that, a check is made by said sensor to see if said retaining member has been separated from said operating member, and when it is separated, an unlocking operation is contained, and when it is not separated, a retry operation is executed.

23. An apparatus according to claim 22, wherein said retry is executed at least twice.

* * * * *

UNITED STATES PATENT AND TRADEMARK OFFICE
CERTIFICATE OF CORRECTION

PATENT NO. : 5,926,627

DATED : July 20, 1999

INVENTOR(S): HIDEO SUGIMURA

It is certified that error appears in the above-identified patent and that said Letters Patent is hereby corrected as shown below:

COLUMN 5:

Line 28, "be" should read --also be--.
    Line 29, "also" should be deleted.

COLUMN 14:

Line 7, "surface" should read --surface of--.

COLUMN 16:

Line 60, "the" should read --said--.

COLUMN 18:

Line 16, "be" should be deleted.

UNITED STATES PATENT AND TRADEMARK OFFICE
CERTIFICATE OF CORRECTION

PATENT NO. : 5,926,627

DATED : July 20, 1999

INVENTOR(S): HIDEO SUGIMURA

It is certified that error appears in the above-identified patent and that said Letters Patent is hereby corrected as shown below:

COLUMN 20:

Line 43, "operating member is" should read --operating member,--.
    Line 44, "further provided," should be deleted.

Signed and Sealed this

Twentieth Day of June, 2000

Attest:

Q. TODD DICKINSON

Attesting Officer     Director of Patents and Trademarks